(12) United States Patent
French et al.

(10) Patent No.: US 12,083,915 B2
(45) Date of Patent: Sep. 10, 2024

(54) VEHICLE DOCKING STATIONS SYSTEMS AND METHODS

(71) Applicant: Lyft, Inc., San Francisco, CA (US)

(72) Inventors: Merric-Andrew Jaranowski French, San Francisco, CA (US); Rochus Emanuel Jacob, San Francisco, CA (US); Oliver Maximilian Mueller, San Francisco, CA (US)

(73) Assignee: Lyft, Inc., San Francisco, CA (US)

( * ) Notice: Subject to any disclaimer, the term of this patent is extended or adjusted under 35 U.S.C. 154(b) by 1107 days.

(21) Appl. No.: 16/716,295

(22) Filed: Dec. 16, 2019

(65) Prior Publication Data

US 2021/0178921 A1    Jun. 17, 2021

(51) Int. Cl.
*H02J 7/00* (2006.01)
*B60L 53/31* (2019.01)
*B60L 53/36* (2019.01)
*B62H 3/04* (2006.01)
*B62H 3/00* (2006.01)

(52) U.S. Cl.
CPC ............... *B60L 53/31* (2019.02); *B60L 53/36* (2019.02); *B62H 3/04* (2013.01); *B62H 2003/005* (2013.01); *B62H 2700/00* (2013.01)

(58) Field of Classification Search
CPC ........... B60L 53/31; B60L 53/36; B62H 3/04; B62H 2003/005; B62H 2700/00
USPC ........................................................ 320/109
See application file for complete search history.

(56) References Cited

U.S. PATENT DOCUMENTS

| | | | | |
|---|---|---|---|---|
| 11,712,975 | B2 * | 8/2023 | Saint-Germain | ....... B60L 53/16 320/108 |
| 2008/0297108 | A1 * | 12/2008 | Le Gars | ................... B62H 3/00 320/109 |
| 2009/0266673 | A1 * | 10/2009 | Dallaire | .................. G07F 17/10 70/262 |
| 2009/0301976 | A1 * | 12/2009 | Ayotte | ..................... B62H 3/00 211/5 |

(Continued)

FOREIGN PATENT DOCUMENTS

WO    WO-2020123337 A1 *  6/2020   .............. B60L 53/16

OTHER PUBLICATIONS

WO 2020123337 Montague, David (Year: 2020).*

*Primary Examiner* — Alexis B Pacheco
(74) *Attorney, Agent, or Firm* — Baker Botts L.L.P.

(57) ABSTRACT

Techniques are disclosed for systems and methods to provide modular docking systems and rebalancing systems for micro-mobility fleet vehicles. A modular micro-mobility fleet vehicle docking system includes a base platform including a modular station body receptacle disposed on a top surface of the base platform and a modular station body including a vehicle retention system configured to secure a micro-mobility fleet vehicle to the modular station body. The modular station body includes a base platform interface disposed at a bottom surface of the modular station body that is configured to be physically secured to the base platform by the modular station body receptacle. The modular station body receptacle includes a station locking interface configured to releasably secure the modular station body to the base platform and/or an electrical interface configured to provide power to the modular station body.

15 Claims, 20 Drawing Sheets

(56) References Cited

U.S. PATENT DOCUMENTS

| | | | |
|---|---|---|---|
| 2010/0089846 A1* | 4/2010 | Navarro Ruiz | H02J 7/0042 |
| | | | 320/109 |
| 2010/0228405 A1* | 9/2010 | Morgal | B62H 3/00 |
| | | | 701/1 |
| 2011/0148346 A1* | 6/2011 | Gagosz | B60L 50/20 |
| | | | 320/135 |
| 2012/0206306 A1* | 8/2012 | Hager | B60L 53/68 |
| | | | 343/890 |
| 2013/0234663 A1* | 9/2013 | Kushalappa | B60L 3/0007 |
| | | | 320/109 |
| 2015/0077239 A1* | 3/2015 | Litjen | B60L 53/16 |
| | | | 320/109 |
| 2016/0176304 A1* | 6/2016 | Sun | B60R 25/093 |
| | | | 320/108 |
| 2017/0036722 A1* | 2/2017 | Assénat | B62H 3/00 |
| 2017/0116805 A1* | 4/2017 | Neupert | B60L 53/31 |
| 2019/0244284 A1* | 8/2019 | Miwa | G07F 15/005 |
| 2020/0031247 A1* | 1/2020 | Moravick | B60L 50/20 |
| 2020/0227903 A1* | 7/2020 | Helnerus | H02G 3/16 |
| 2021/0107579 A1* | 4/2021 | Adam | B60L 50/20 |
| 2022/0258624 A1* | 8/2022 | Deppe | B60L 53/14 |

\* cited by examiner

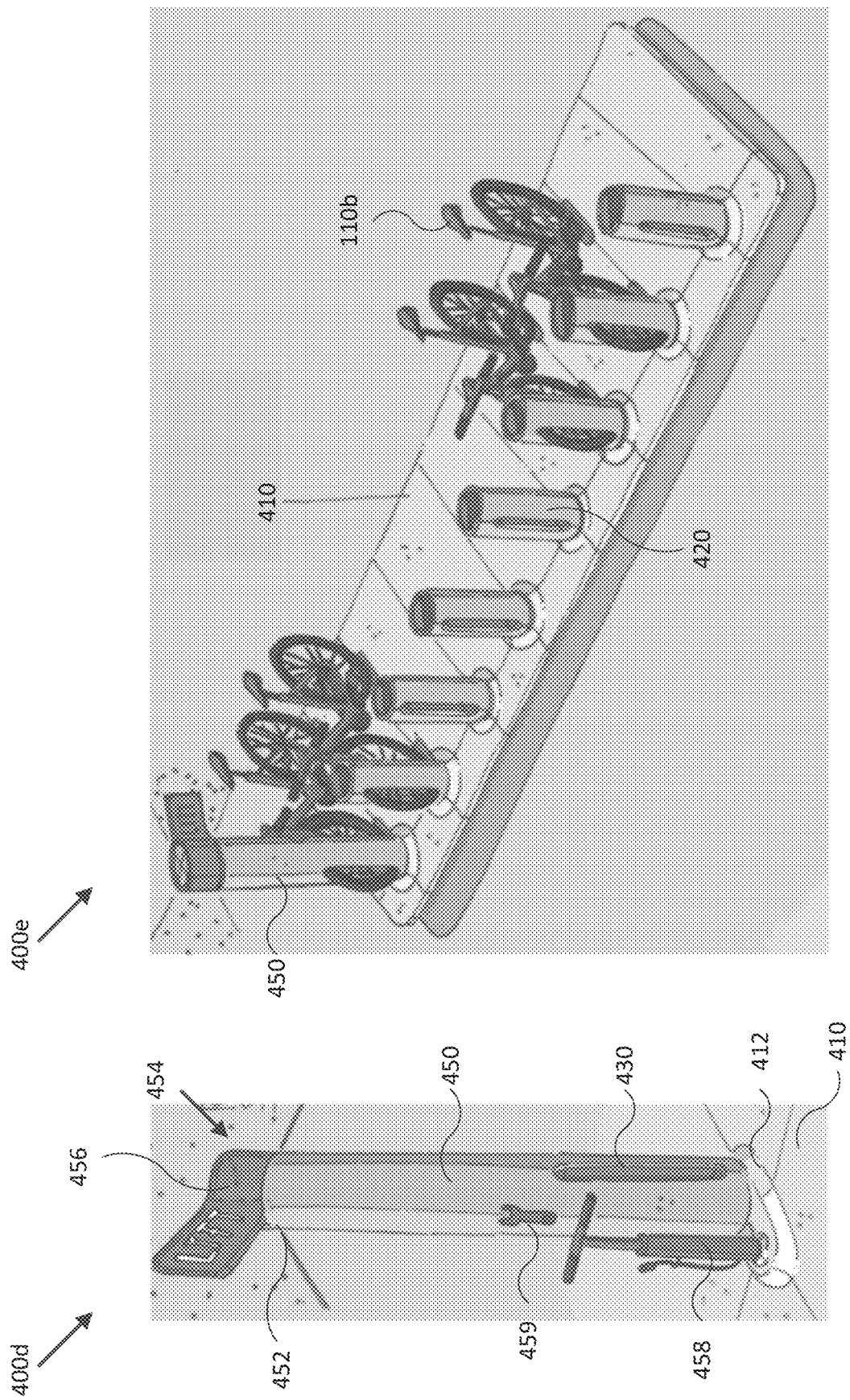

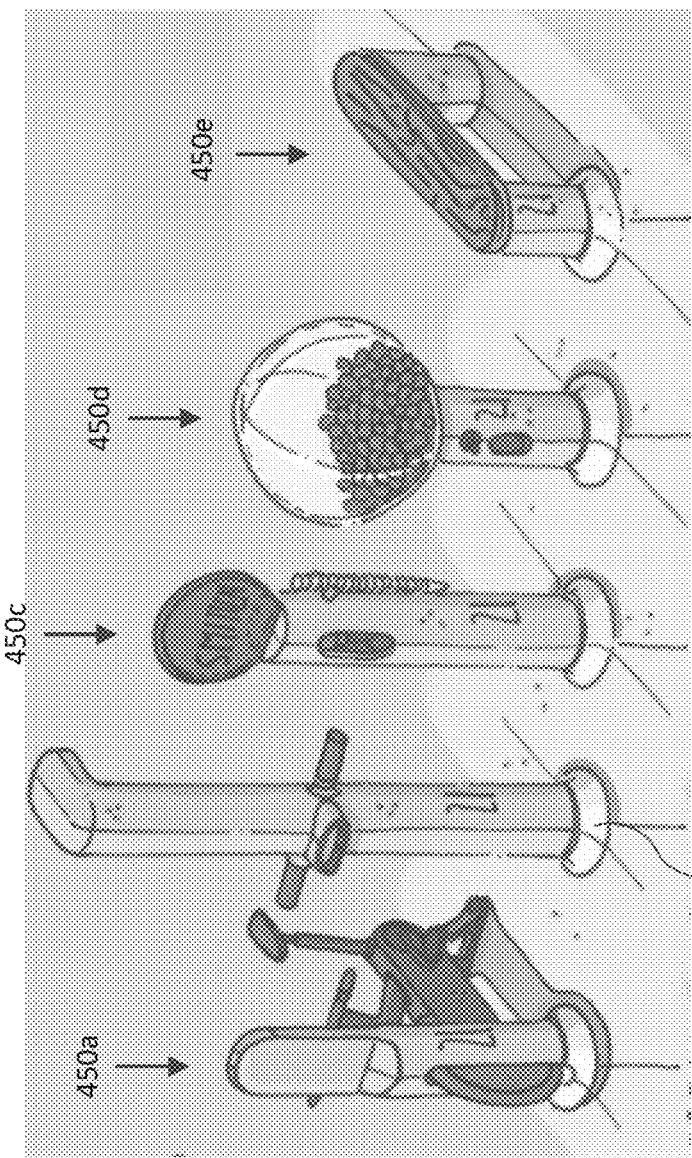
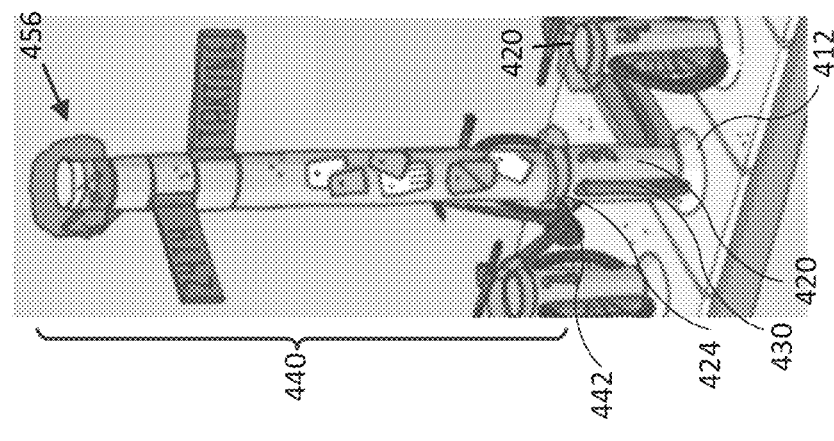
Fig. 4G
Fig. 4F

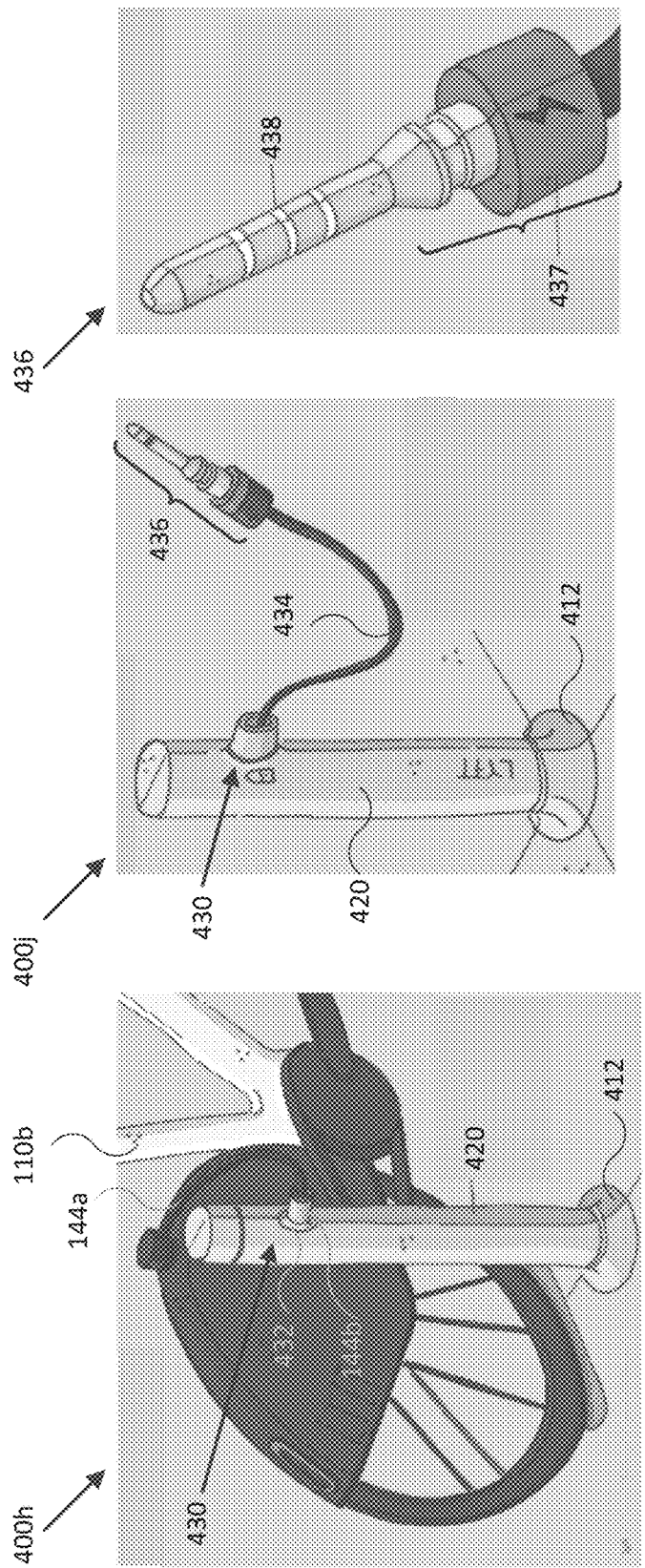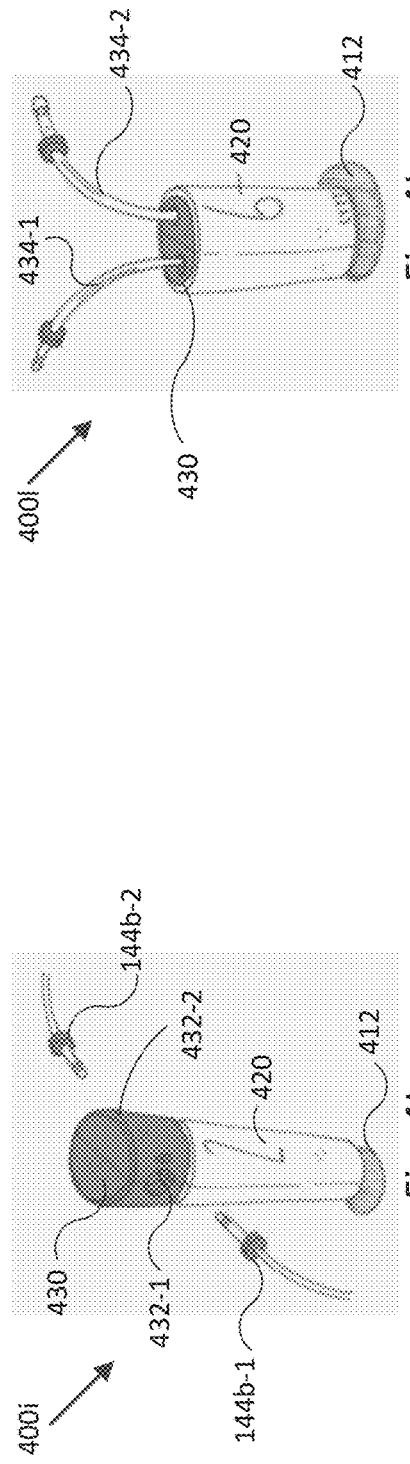

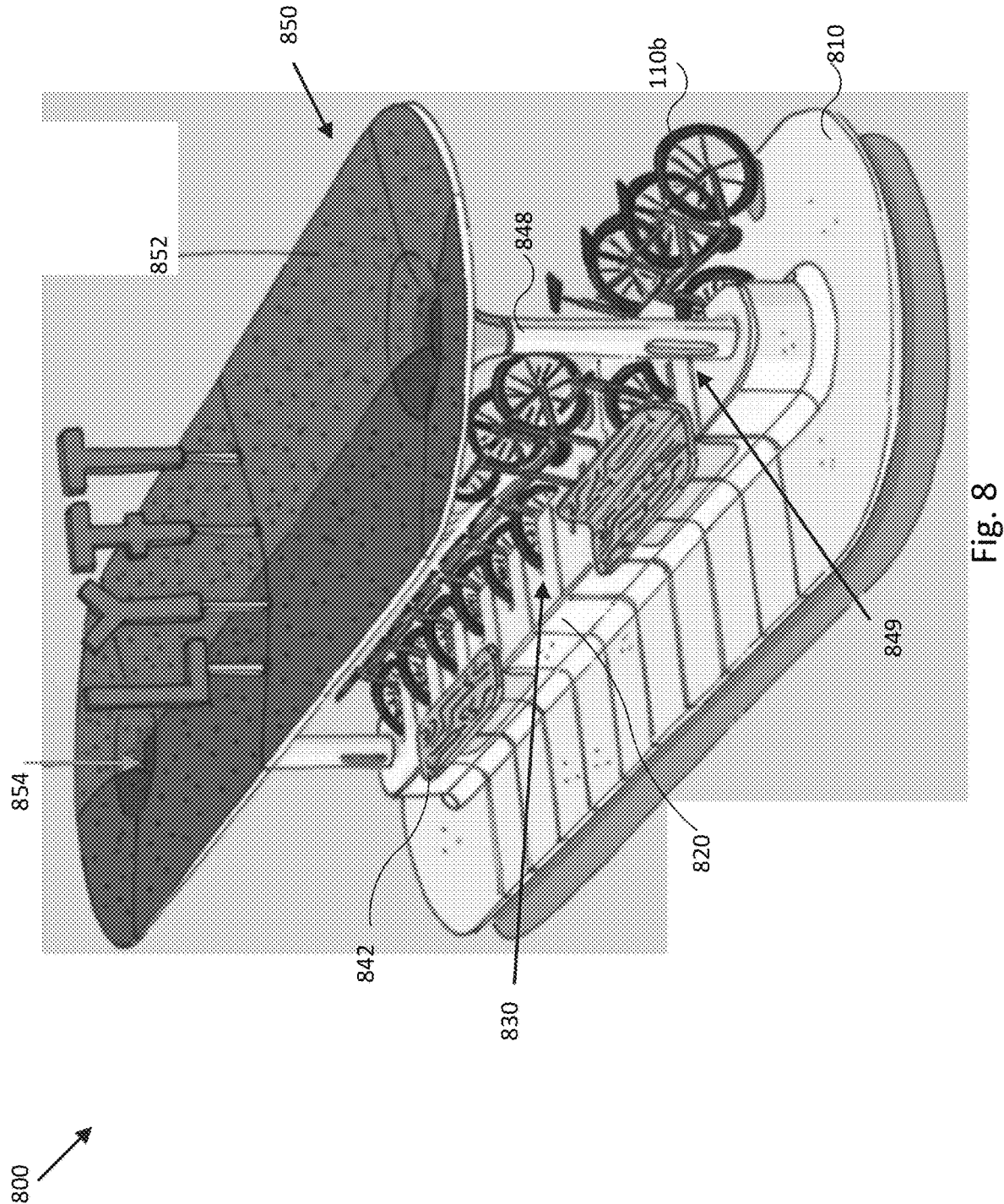

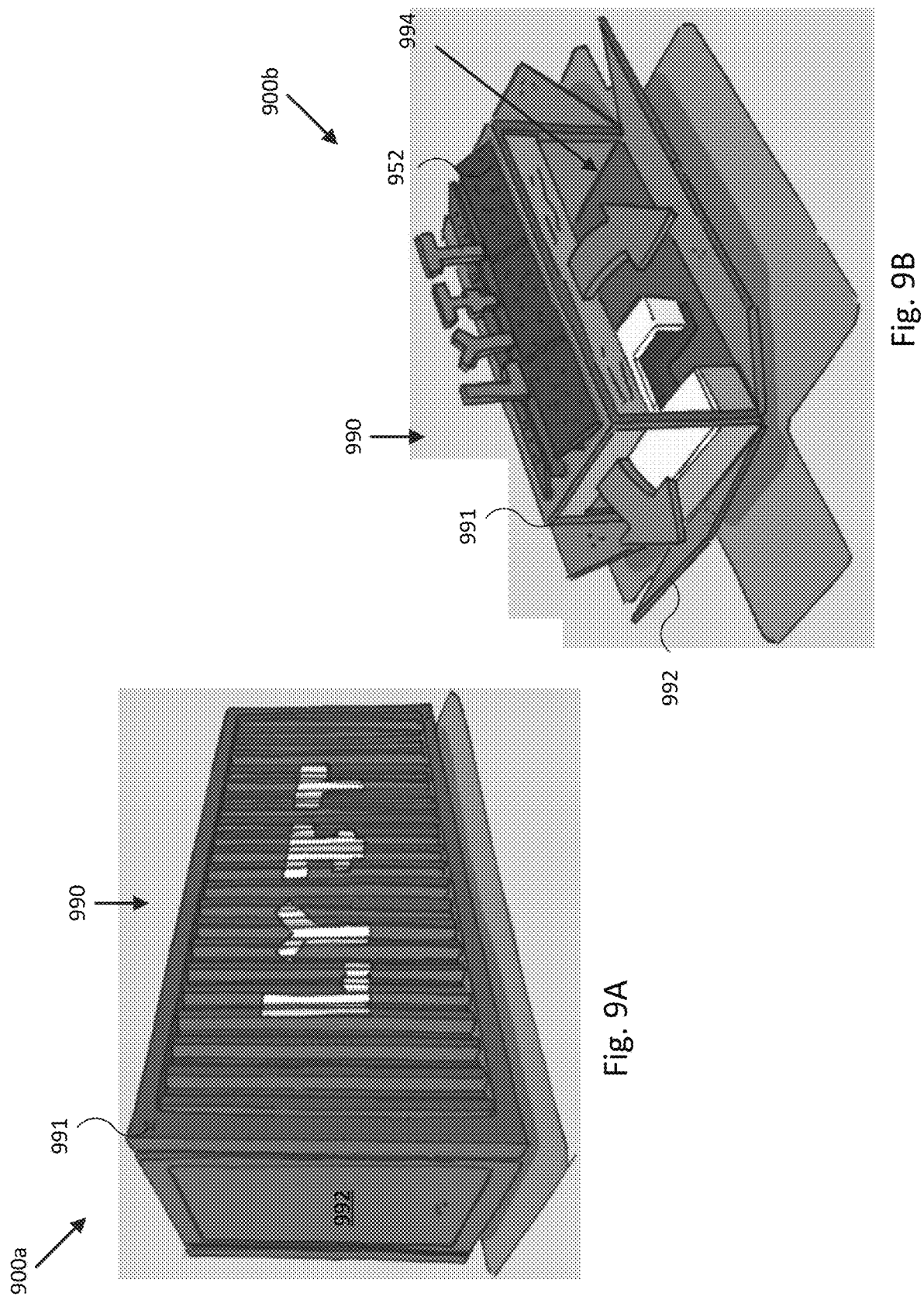

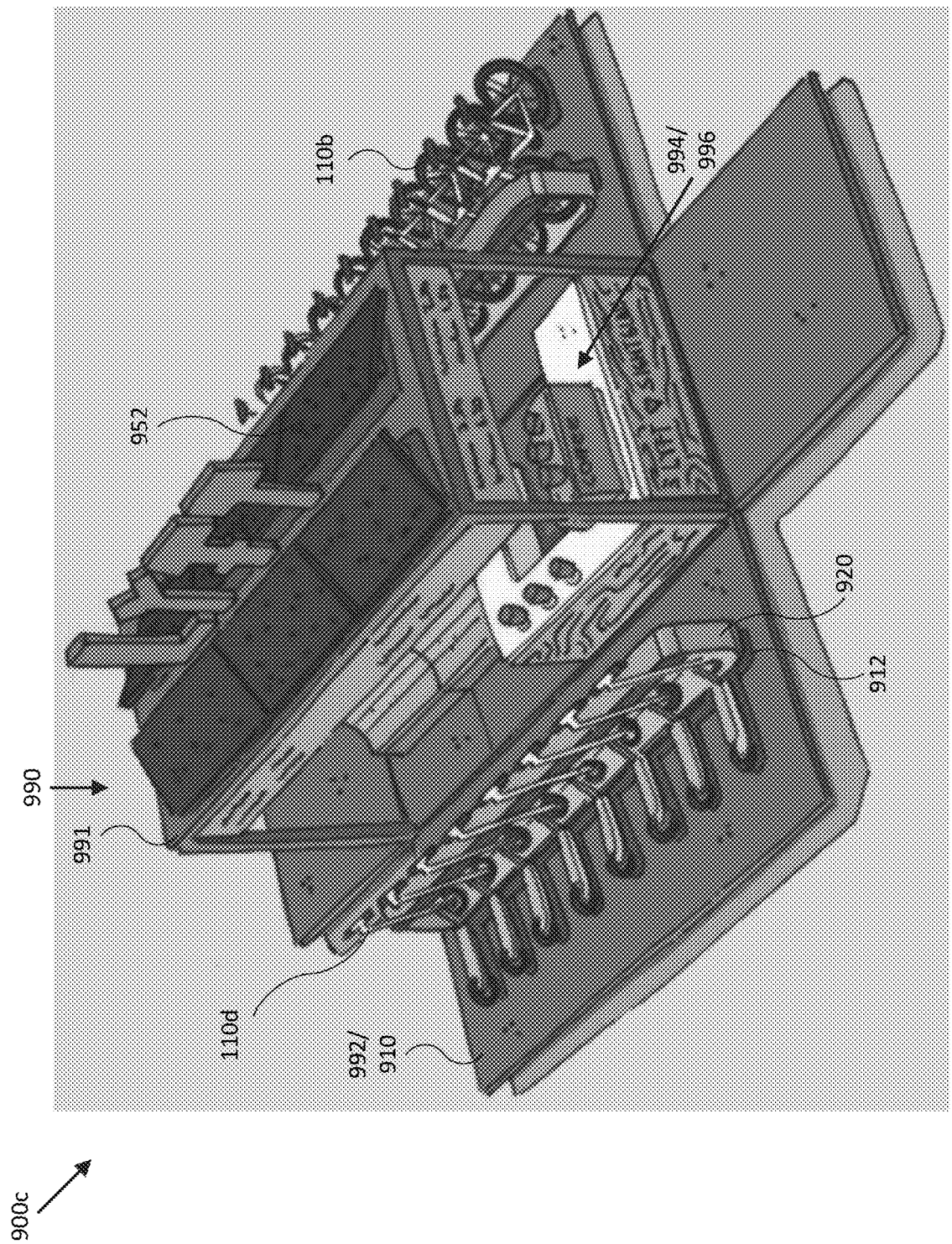

VEHICLE DOCKING STATIONS SYSTEMS AND METHODS

TECHNICAL FIELD

One or more embodiments of the present disclosure relate generally to vehicle docking stations and more particularly, for example, to systems and methods for providing interchangeable and/or modular vehicle docking stations.

BACKGROUND

Contemporary transportation services may incorporate a variety of different types of vehicles, including motorized or electric kick scooters, bicycles, and/or motor scooters designed to transport one or perhaps two people at once (collectively, micro-mobility fleet vehicles). Deployment, organization, and servicing of a large group of micro-mobility fleet vehicles can be difficult, particularly when such vehicles are incorporated into a transportation management system implementing a dynamic transportation matching system that links requestors or riders to fleet vehicles for temporary rental and personal use, where a fleet manager/servicer typically wants to provide a sufficient number of safe and operational fleet vehicles to serve a temporally dynamic population of requesters with minimal risk of fleet vehicle clutter (e.g., fleet vehicles parked/abandoned in public thoroughfares).

Therefore, there is a need in the art for systems and methods to dynamically provision micro-mobility fleet vehicles (e.g., to "rebalance" the supply of micro-mobility fleet vehicles to compensate for variations in requestor populations) and associated docking stations for such micro-mobility fleet vehicles (e.g., to provide secure and organized parking, charging, service, and requestor co-location), cost effectively across a transportation service territory associated with a fleet manager/servicer for a transportation management system, and particularly in the context of a dynamic transportation matching system providing transportation services incorporating such micro-mobility fleet vehicles.

SUMMARY

Techniques are disclosed for systems and methods to provide modular docking systems and rebalancing systems for micro-mobility fleet vehicles. In accordance with one or more embodiments, a modular micro-mobility fleet vehicle docking system may include a base platform including a modular station body receptacle disposed on a top surface of the base platform and a modular station body including a vehicle retention system configured to secure a micro-mobility fleet vehicle to the modular station body. The modular station body may include a base platform interface disposed at a bottom surface of the modular station body that is configured to be physically secured to the base platform by the modular station body receptacle. The modular station body receptacle may include a station locking interface configured to releasably secure the modular station body to the base platform and/or an electrical interface configured to provide power to the modular station body.

In additional embodiments, a method for modular docking system deployment may include determining a deployment strategy for a modular micro-mobility fleet vehicle docking system including a base platform and a modular station body, wherein the base platform includes a modular station body receptacle disposed on a top surface of the base platform, and wherein the modular station body includes a vehicle retention system configured to secure a micro-mobility fleet vehicle to the modular station body; deploying a base platform of the modular micro-mobility fleet vehicle docking system according to the determined deployment strategy; and securing a modular station body to the deployed base platform, wherein the modular station body is selected based, at least in part, on the determined deployment strategy, and wherein the modular station body comprises a base platform interface disposed at a bottom surface of the modular station body that is configured to be physically secured to the base platform by the modular station body receptacle.

According to some embodiments, a non-transitory machine-readable medium may include a plurality of machine-readable instructions which when executed by one or more processors are adapted to cause the one or more processors to perform a method. In some embodiments, the method may include determining a deployment strategy for a modular micro-mobility fleet vehicle docking system including a base platform and a modular station body, wherein the base platform includes a modular station body receptacle disposed on a top surface of the base platform, and wherein the modular station body includes a vehicle retention system configured to secure a micro-mobility fleet vehicle to the modular station body; deploying a base platform of the modular micro-mobility fleet vehicle docking system according to the determined deployment strategy; and securing a modular station body to the deployed base platform, wherein the modular station body is selected based, at least in part, on the determined deployment strategy, and wherein the modular station body comprises a base platform interface disposed at a bottom surface of the modular station body that is configured to be physically secured to the base platform by the modular station body receptacle.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIGS. 4A-L illustrate various elements of a modular docking system in accordance with an embodiment of the disclosure.

FIG. 8 illustrates a demark station incorporating various elements of a modular docking system in accordance with an embodiment of the disclosure.

FIGS. 9A-C illustrate a rebalancing system incorporating various elements of a modular docking system in accordance with an embodiment of the disclosure.

Embodiments of the invention and their advantages are best understood by referring to the detailed description that follows. It should be appreciated that like reference numerals are used to identify like elements illustrated in one or more of the figures.

DETAILED DESCRIPTION

In accordance with various embodiments of the present disclosure, modular docking systems and rebalancing systems for micro-mobility fleet vehicles provide a relatively reliable, inexpensive, and robust methodology for the management, service, and safe operation of fleet vehicles provided for hire by a fleet manager, such as a transportation services provider employing a dynamic transportation matching system to link fleet vehicles to customers, including requestors/riders of micro-mobility fleet vehicles, as described herein. For example, by being modular, individual elements of the modular docking system may be retrieved and replaced without having to replace or retire entire docking stations while repairs are ongoing. Moreover, individual elements of the modular docking system may be upgraded and/or expanded without ceding critical demark space to competing transportation service providers.

Figure 1:
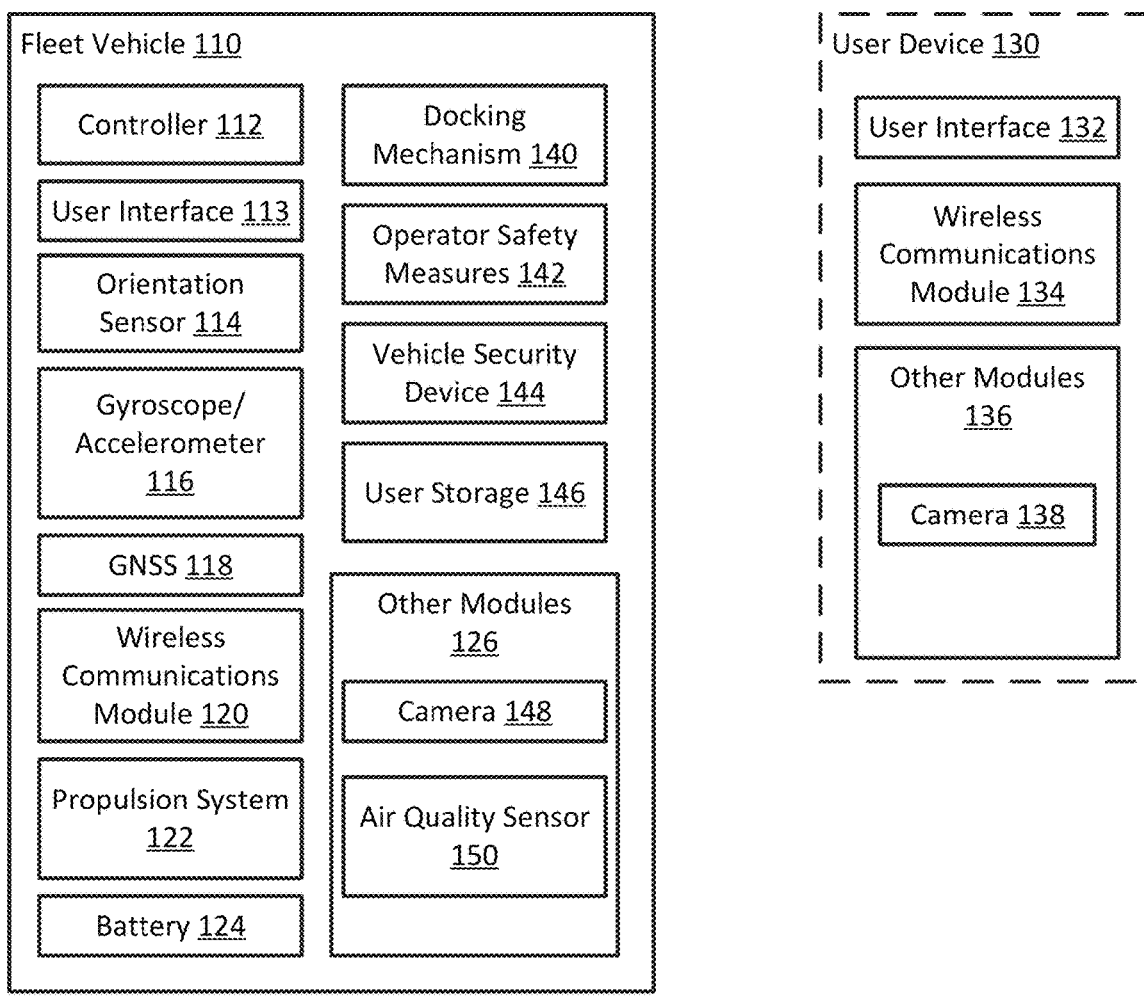
FIG. 1 illustrates a block diagram of a portion of a dynamic transportation matching system including a fleet vehicle in accordance with an embodiment of the disclosure.

FIG. 1 illustrates a block diagram of a portion of a dynamic transportation matching system (e.g., system 100) including a fleet vehicle 110 in accordance with an embodiment of the disclosure. In the embodiment shown in FIG. 1, system 100 includes fleet vehicle 110 and optional user device 130. In general, fleet vehicle 110 may be a passenger vehicle designed to transport a single transportation requester (e.g., a micro-mobility fleet vehicle) or a group of transportation requesters (e.g., a typical car or truck). More specifically, fleet vehicle 110 may be implemented as a motorized or electric kick scooter, bicycle, and/or motor scooter designed to transport one or perhaps two riders at once typically on a paved road (collectively, micro-mobility fleet vehicles), as a typical automobile configured to transport up to 4, 7, or 10 transportation requesters at once in a shared ride, or according to a variety of different transportation modalities (e.g., transportation mechanisms). Fleet vehicles similar to fleet vehicle 110 may be owned, managed, and/or serviced primarily by a fleet manager/servicer providing fleet vehicle 110 for rental and use by the public as one or more types of transportation modalities offered by a dynamic transportation matching system, for example, or may be owned, managed, and/or serviced by a private owner using the dynamic transportation matching system to match their vehicle to a transportation request, such as with ridesharing or ridesourcing applications typically executed on a mobile user device, such as user device 130 as described herein. Optional user device 130 may be a smartphone, tablet, near field communication (NFC) or radio-frequency identification (RFID) enabled smart card, or other personal or portable computing and/or communication device that may be used to facilitate rental and/or operation of fleet vehicle 110.

As shown in FIG. 1, fleet vehicle 110 may include one or more of a controller 112, a user interface 113, an orientation sensor 114, a gyroscope/accelerometer 116, a global navigation satellite system receiver (GNSS) 118, a wireless communications module 120, a camera 148, a propulsion system 122, an air quality sensor 150, and other modules 126. Operation of fleet vehicle 110 may be substantially manual, autonomous, and/or partially or completely controlled by optional user device 130, which may include one or more of a user interface 132, a wireless communications module 134, a camera 138, and other modules 136. In other embodiments, fleet vehicle 110 may include any one or more of the elements of user device 130. In some embodiments, one or more of the elements of system 100 may be implemented in a combined housing or structure that can be coupled to or within fleet vehicle 110 and/or held or carried by a user or rider (e.g., transportation requester) of system 100.

Controller 112 may be implemented as any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of fleet vehicle 110 and/or other elements of system 100, for example. Such software instructions may also implement methods for processing images and/or other sensor signals or data, determining sensor information, providing user feedback (e.g., through user interface 113 or 132), querying devices for operational parameters, selecting operational parameters for devices, or performing any of the various operations described herein (e.g., operations performed by logic devices of various devices of system 100).

In addition, a non-transitory medium may be provided for storing machine readable instructions for loading into and execution by controller 112. In these and other embodiments, controller 112 may be implemented with other components where appropriate, such as volatile memory, non-volatile memory, one or more interfaces, and/or various analog and/or digital components for interfacing with devices of system 100. For example, controller 112 may be adapted to store sensor signals, sensor information, parameters for coordinate frame transformations, calibration parameters, sets of calibration points, and/or other operational parameters, over time, for example, and provide such stored data to a user via user interface 113 or 132. In some embodiments, controller 112 may be integrated with one or more other elements of fleet vehicle 110, for example, or distributed as multiple logic devices within fleet vehicle 110 and/or user device 130.

In some embodiments, controller 112 may be configured to substantially continuously monitor and/or store the status of and/or sensor data provided by one or more elements of fleet vehicle 110 and/or user device 130, such as the position and/or orientation of fleet vehicle 110 and/or user device 130, for example, and the status of a communication link established between fleet vehicle 110 and/or user device 130. Such communication links may be established and then provide for transmission of data between elements of system 100 substantially continuously throughout operation of system 100, where such data includes various types of sensor data, control parameters, and/or other data.

User interface 113 of fleet vehicle 110 may be implemented as one or more of a display, a touch screen, a keyboard, a mouse, a joystick, a knob, a steering wheel, a yoke, and/or any other device capable of accepting user input and/or providing feedback to a user or rider. In various embodiments, user interface 113 may be adapted to provide user input (e.g., as a type of signal and/or sensor information transmitted by wireless communications module 134 of user device 130) to other devices of system 100, such as controller 112. User interface 113 may also be implemented with one or more logic devices (e.g., similar to controller 112) that may be adapted to store and/or execute instructions, such as software instructions, implementing any of the various processes and/or methods described herein. For example, user interface 132 may be adapted to form communication links, transmit and/or receive communications (e.g., infrared images and/or other sensor signals, control signals, sensor information, user input, and/or other information), for example, or to perform various other processes and/or methods described herein.

In one embodiment, user interface 113 may be adapted to display a time series of various sensor information and/or other parameters as part of or overlaid on a graph or map, which may be referenced to a position and/or orientation of fleet vehicle 110 and/or other elements of system 100. For example, user interface 113 may be adapted to display a time series of positions, headings, and/or orientations of fleet vehicle 110 and/or other elements of system 100 overlaid on a geographical map, which may include one or more graphs indicating a corresponding time series of actuator control signals, sensor information, and/or other sensor and/or control signals. In some embodiments, user interface 113 may be adapted to accept user input including a user-defined target heading, waypoint, route, and/or orientation, for example, and to generate control signals to cause fleet vehicle 110 to move according to the target heading, route, and/or orientation. In other embodiments, user interface 113 may be adapted to accept user input modifying a control loop parameter of controller 112, for example.

Orientation sensor 114 may be implemented as one or more of a compass, float, accelerometer, and/or other device capable of measuring an orientation of fleet vehicle 110 (e.g., magnitude and direction of roll, pitch, and/or yaw, relative to one or more reference orientations such as gravity and/or Magnetic North), camera 148, and/or other elements of system 100, and providing such measurements as sensor signals and/or data that may be communicated to various devices of system 100. Gyroscope/accelerometer 116 may be implemented as one or more electronic sextants, semiconductor devices, integrated chips, accelerometer sensors, accelerometer sensor systems, or other devices capable of measuring angular velocities/accelerations and/or linear accelerations (e.g., direction and magnitude) of fleet vehicle 110 and/or other elements of system 100 and providing such measurements as sensor signals and/or data that may be communicated to other devices of system 100 (e.g., user interface 132, controller 112).

GNSS receiver 118 may be implemented according to any global navigation satellite system, including a GPS, GLONASS, and/or Galileo based receiver and/or other device capable of determining absolute and/or relative position of fleet vehicle 110 (e.g., or an element of fleet vehicle 110) based on wireless signals received from space-born and/or terrestrial sources (e.g., eLoran, and/or other at least partially terrestrial systems), for example, and capable of providing such measurements as sensor signals and/or data (e.g., coordinates) that may be communicated to various devices of system 100. In some embodiments, GNSS 118 may include an altimeter, for example, or may be used to provide an absolute altitude.

Wireless communications module 120 may be implemented as any wireless communications module configured to transmit and receive analog and/or digital signals between elements of system 100. For example, wireless communications module 120 may be configured to receive control signals and/or data from user device 130 and provide them to controller 112 and/or propulsion system 122. In other embodiments, wireless communications module 120 may be configured to receive images and/or other sensor information (e.g., still images or video images) and relay the sensor data to controller 112 and/or user device 130. In some embodiments, wireless communications module 120 may be configured to support spread spectrum transmissions, for example, and/or multiple simultaneous communications channels between elements of system 100. Wireless communication links formed by wireless communications module 120 may include one or more analog and/or digital radio communication links, such as WiFi, Bluetooth, NFC, RFID, and others, as described herein, and may be direct communication links established between elements of system 100, for example, or may be relayed through one or more wireless relay stations configured to receive and retransmit wireless communications. In various embodiments, wireless communications module 120 may be configured to support wireless mesh networking, as described herein.

In some embodiments, wireless communications module 120 may be configured to be physically coupled to fleet vehicle 110 and to monitor the status of a communication link established between fleet vehicle 110 and/or user device 130. Such status information may be provided to controller 112, for example, or transmitted to other elements of system 100 for monitoring, storage, or further processing, as described herein. In addition, wireless communications module 120 may be configured to determine a range to another device, such as based on time of flight, and provide such range to the other device and/or controller 112. Communication links established by communication module 120 may be configured to transmit data between elements of system 100 substantially continuously throughout operation of system 100, where such data includes various types of sensor data, control parameters, and/or other data, as described herein.

Propulsion system 122 may be implemented as one or more motor-based propulsion systems, and/or other types of propulsion systems that can be used to provide motive force to fleet vehicle 110 and/or to steer fleet vehicle 110. In some embodiments, propulsion system 122 may include elements that can be controlled (e.g., by controller 112 and/or user interface 113) to provide motion for fleet vehicle 110 and to provide an orientation for fleet vehicle 110. In various embodiments, propulsion system 122 may be implemented with a portable power supply, such as a battery and/or a combustion engine/generator and fuel supply.

For example, in some embodiments, such as when propulsion system 122 is implemented by an electric motor (e.g., as with many micro-mobility fleet vehicles), fleet vehicle 110 may include battery 124. Battery 124 may be implemented by one or more battery cells (e.g., lithium ion battery cells) and be configured to provide electrical power to propulsion system 122 to propel fleet vehicle 110, for example, as well as to various other elements of system 100, including controller 112, user interface 113, and/or wireless communications module 120. In some embodiments, battery 123 may be implemented with its own safety measures, such as thermal interlocks and a fire-resistant enclosure, for example, and may include one or more logic devices, sensors, and/or a display to monitor and provide visual feedback of a charge status of battery 124 (e.g., a charge percentage, a low charge indicator, etc.).

Other modules 126 may include other and/or additional sensors, actuators, communications modules/nodes, and/or user interface devices, for example, and may be used to provide additional environmental information related to operation of fleet vehicle 110, for example. In some embodiments, other modules 126 may include a humidity sensor, a wind and/or water temperature sensor, a barometer, an altimeter, a radar system, a proximity sensor, a visible spectrum camera or infrared camera (with an additional mount), and/or other environmental sensors providing measurements and/or other sensor signals that can be displayed to a user or rider and/or used by other devices of system 100 (e.g., controller 112) to provide operational control of fleet vehicle 110 and/or system 100. In further embodiments, other modules 126 may include a light, such as a headlight or indicator light, and/or an audible alarm, both of which may be activated to alert passersby to possible theft, abandonment, and/or other critical statuses of fleet vehicle 110. In particular, and as shown in FIG. 1, other modules 126 may include camera 148 and/or air quality sensor 150.

Camera 148 may be implemented as an imaging device including an imaging module including an array of detector elements that can be arranged in a focal plane array. In various embodiments, camera 148 may include one or more logic devices (e.g., similar to controller 112) that can be configured to process imagery captured by detector elements of camera 148 before providing the imagery to communications module 120. More generally, camera 148 may be configured to perform any of the operations or methods described herein, at least in part, or in combination with controller 112 and/or user interface 113 or 132.

In various embodiments, air quality sensor 150 may be implemented as an air sampling sensor configured to determine an air quality of an environment about fleet vehicle 110 and provide corresponding air quality sensor data. Air quality sensor data provided by air quality sensor 150 may include particulate count, methane content, ozone content, and/or other air quality sensor data associated with common street level sensitivities and/or health monitoring typical when in a street level environment, such as that experienced when riding on a typical micro-mobility fleet vehicle, as described herein.

Fleet vehicles implemented as micro-mobility fleet vehicles may include a variety of additional features designed to facilitate fleet management and user and environmental safety. For example, as shown in FIG. 1, fleet vehicle 110 may include one or more of docking mechanism 140, operator safety measures 142, vehicle security device 144, and/or user storage 146, as described in more detail herein by reference to FIGS. 3A-C.

User interface 132 of user device 130 may be implemented as one or more of a display, a touch screen, a keyboard, a mouse, a joystick, a knob, a steering wheel, a yoke, and/or any other device capable of accepting user input and/or providing feedback to a user. In various embodiments, user interface 132 may be adapted to provide user input (e.g., as a type of signal and/or sensor information transmitted by wireless communications module 134 of user device 130) to other devices of system 100, such as controller 112. User interface 132 may also be implemented with one or more logic devices (e.g., similar to controller 112) that may be adapted to store and/or execute instructions, such as software instructions, implementing any of the various processes and/or methods described herein. For example, user interface 132 may be adapted to form communication links, transmit and/or receive communications (e.g., infrared images and/or other sensor signals, control signals, sensor information, user input, and/or other information), for example, or to perform various other processes and/or methods described herein.

In one embodiment, user interface 132 may be adapted to display a time series of various sensor information and/or other parameters as part of or overlaid on a graph or map, which may be referenced to a position and/or orientation of fleet vehicle 110 and/or other elements of system 100. For example, user interface 132 may be adapted to display a time series of positions, headings, and/or orientations of fleet vehicle 110 and/or other elements of system 100 overlaid on a geographical map, which may include one or more graphs indicating a corresponding time series of actuator control signals, sensor information, and/or other sensor and/or control signals. In some embodiments, user interface 132 may be adapted to accept user input including a user-defined target heading, waypoint, route, and/or orientation, for example, and to generate control signals to cause fleet vehicle 110 to move according to the target heading, route, and/or orientation. In other embodiments, user interface 132 may be adapted to accept user input modifying a control loop parameter of controller 112, for example.

Wireless communications module 134 may be implemented as any wireless communications module configured to transmit and receive analog and/or digital signals between elements of system 100. For example, wireless communications module 134 may be configured to transmit control signals from user interface 132 to wireless communications module 120 or 144. In some embodiments, wireless communications module 134 may be configured to support spread spectrum transmissions, for example, and/or multiple simultaneous communications channels between elements of system 100. In various embodiments, wireless communications module 134 may be configured to monitor the status of a communication link established between user device 130 and/or fleet vehicle 110 (e.g., including packet loss of transmitted and received data between elements of system 100, such as with digital communication links), and/or determine a range to another device, as described herein. Such status information may be provided to user interface 132, for example, or transmitted to other elements of system 100 for monitoring, storage, or further processing, as described herein. In various embodiments, wireless communications module 134 may be configured to support wireless mesh networking, as described herein.

Other modules 136 of user device 130 may include other and/or additional sensors, actuators, communications modules/nodes, and/or user interface devices used to provide additional environmental information associated with user device 130, for example. In some embodiments, other modules 136 may include a humidity sensor, a wind and/or water temperature sensor, a barometer, a radar system, a visible spectrum camera, an infrared camera, a GNSS receiver, and/or other environmental sensors providing measurements and/or other sensor signals that can be displayed to a user or rider and/or used by other devices of system 100 (e.g., controller 112) to provide operational control of fleet vehicle 110 and/or system 100 or to process sensor data to compensate for environmental conditions. As shown in FIG. 1, other modules 136 may include camera 138.

Camera 138 may be implemented as an imaging device including an imaging module including an array of detector elements that can be arranged in a focal plane array. In various embodiments, camera 138 may include one or more logic devices (e.g., similar to controller 112) that can be configured to process imagery captured by detector elements of camera 138 before providing the imagery to communications module 120. More generally, camera 138 may be configured to perform any of the operations or methods described herein, at least in part, or in combination with controller 138 and/or user interface 113 or 132.

In general, each of the elements of system 100 may be implemented with any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a method for providing sensor data and/or imagery, for example, or for transmitting and/or receiving communications, such as sensor signals, sensor information, and/or control signals, between one or more devices of system 100.

In addition, one or more non-transitory mediums may be provided for storing machine readable instructions for loading into and execution by any logic device implemented with one or more of the devices of system 100. In these and other embodiments, the logic devices may be implemented with other components where appropriate, such as volatile memory, non-volatile memory, and/or one or more interfaces (e.g., inter-integrated circuit (I2C) interfaces, mobile industry processor interfaces (MIPI), joint test action group (JTAG) interfaces (e.g., IEEE 1149.1 standard test access port and boundary-scan architecture), and/or other interfaces, such as an interface for one or more antennas, or an interface for a particular type of sensor).

Sensor signals, control signals, and other signals may be communicated among elements of system 100 and/or elements of other systems similar to system 100 using a variety of wired and/or wireless communication techniques, including voltage signaling, Ethernet, WiFi, Bluetooth, Zigbee, Xbee, Micronet, Near-field Communication (NFC) or other medium and/or short range wired and/or wireless networking protocols and/or implementations, for example. In such embodiments, each element of system 100 may include one or more modules supporting wired, wireless, and/or a combination of wired and wireless communication techniques, including wireless mesh networking techniques. In some embodiments, various elements or portions of elements of system 100 may be integrated with each other, for example, or may be integrated onto a single printed circuit board (PCB) to reduce system complexity, manufacturing costs, power requirements, coordinate frame errors, and/or timing errors between the various sensor measurements.

Each element of system 100 may include one or more batteries, capacitors, or other electrical power storage devices, for example, and may include one or more solar cell modules or other electrical power generating devices. In some embodiments, one or more of the devices may be powered by a power source for fleet vehicle 110, using one or more power leads. Such power leads may also be used to support one or more communication techniques between elements of system 100.

Figure 2:
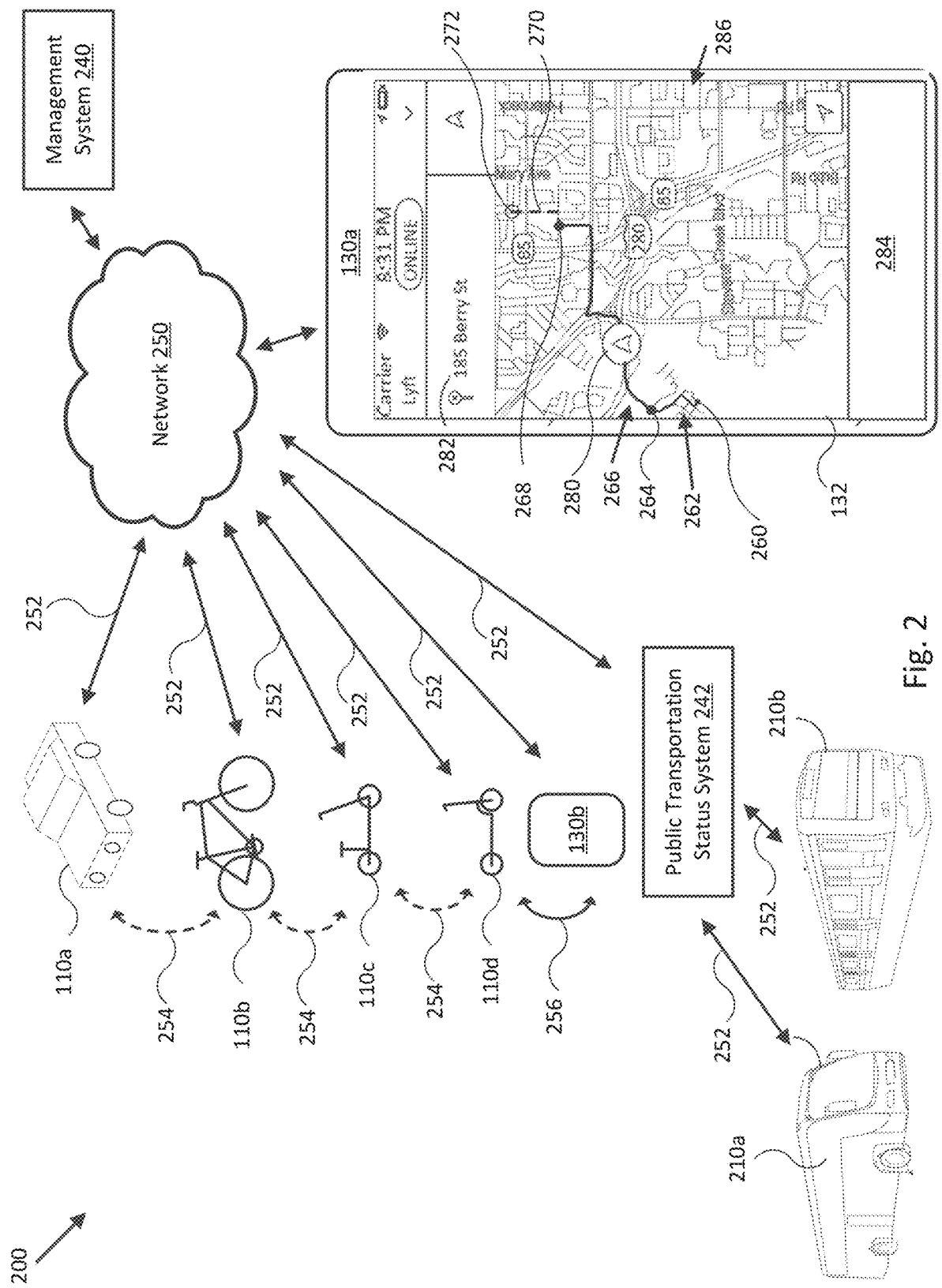
FIG. 2 illustrates a block diagram of a dynamic transportation matching system incorporating a variety of transportation modalities in accordance with an embodiment of the disclosure.

FIG. 2 illustrates a block diagram of dynamic transportation matching system 200 incorporating a variety of transportation modalities in accordance with an embodiment of the disclosure. For example, as shown in FIG. 2, dynamic transportation matching system 200 may include multiple embodiments of system 100. In the embodiment shown in FIG. 2, dynamic transportation matching system 200 includes management system/server 240 in communication with a number of fleet vehicles 110a-d and user devices 130a-b over a combination of a typical wide area network (WAN) 250, WAN communication links 252 (solid lines), a variety of mesh network communication links 254 (curved dashed lines), and NFC, RFID, and/or other local communication links 256 (curved solid lines). Dynamic transportation matching system 200 also includes public transportation status system 242 in communication with a variety of public transportation vehicles, including one or more buses 210a, trains 210b, and/or other public transportation modalities, such as ships, ferries, light rail, subways, streetcars, trolleys, cable cars, monorails, tramways, and aircraft. As shown in FIG. 2, all fleet vehicles are able to communicate directly to WAN 250 and, in some embodiments, may be able to communicate across mesh network communication links 254, to convey fleet data and/or fleet status data amongst themselves and/or to and from management system 240.

In FIG. 2, a requestor may use user device 130a to request, rent, or hire one of fleet vehicles 110a-d by transmitting a transportation request to management system 240 over WAN 250, allowing management system 240 to poll status of fleet vehicles 110a-d and to select one of fleet vehicles 110a-d to fulfill the transportation request; receiving a fulfillment notice from management system 240 and/or from the selected fleet vehicle, and receiving navigation instructions to proceed to or otherwise meet with the selected fleet vehicle. A similar process may be used by a requestor using user device 130b, but where the requestor is able to enable a fleet vehicle over local communication link 263, as shown.

Management system 240 may be implemented as a server with controllers, user interfaces, communications modules, and/or other elements similar to those described with respect to system 100 of FIG. 1, but with sufficient processing and storage resources to manage operation of dynamic transportation matching system 200, including monitoring statuses of fleet vehicles 110a-d, as described herein. In some embodiments, management system 240 may be implemented in a distributed fashion and include multiple separate server embodiments linked communicatively to each other direction and/or through WAN 250. WAN 250 may include one or more of the Internet, a cellular network, and/or other wired or wireless WANs. WAN communication links 252 may be wired or wireless WAN communication links, and mesh network communication links 254 may be wireless communication links between and among fleet vehicles 110a-d, as described herein.

User device 130a in FIG. 2 includes a display of user interface 132 that shows a planned route for a transportation requester attempting to travel from origination point 260 to destination 272 using different transportation modalities (e.g., a planned multimodal route), as depicted in route/street map 286 rendered by user interface 132. For example, management system 240 may be configured to monitor statuses of all available transportation modalities (e.g., including fleet vehicles and public transportation vehicles) and provide a planned multimodal route from origination point 260 to destination 272. Such planned multimodal route may include, for example, walking route 262 from origination point 260 to bus stop 264, bus route 266 from bus stop 264 to bus stop 268, and micro-mobility route 270 (e.g., using one of micro-mobility fleet vehicles 110b, 110c, or 110d) from bus stop 268 to destination 272. Also shown rendered by user interface 132 are present location indicator 280 (indicating a present absolute position of user device 130a on street map 486), navigation destination selector/indicator 282 (e.g., configured to allow a transportation requester to input a desired navigation destination), and notice window 284 (e.g., used to render fleet status data, including user notices and/or alerts, as described herein). For example, a transportation requester may use navigation destination selector/indicator 282 to provide and/or change destination 272, as well as change any leg or modality of the multimodal route from origination point 260 to destination 272. In some embodiments, notice window 284 may display instructions for traveling to a next waypoint along the determined multimodal route (e.g., directions to walk to a bus stop, directions to ride a micro-mobility fleet vehicle to a next stop along the route, etc.). In particular, such instructions may include directions from origination point 260 to a micro-mobility fleet vehicle, thereby addressing the "first mile" problem, and/or directions from one mode of transportation to a micro-mobility fleet vehicle to reach destination 272, thereby resolving the "last mile" problem, as described herein.

In various embodiments, management system 240 may be configured to provide or suggest an optimal multimodal route to a transportation requestor (e.g., initially and/or while traversing a particular planned route), and a requester or rider may select or make changes to such route through manipulation of user device 130a, as shown. For example, management system 240 may be configured to suggest a quickest route, a least expensive route, a most convenient route (to minimize modality changes or physical actions a requester or rider must take along the route), an inclement weather route (e.g., that keeps the user protected from inclement weather a maximum amount of time during route traversal), or some combination of those that is determined as best suited to the user, such as based on various user preferences. Such preferences may be based on prior use of system 200, prior user trips, a desired arrival time and/or departure time (e.g., based on user input or obtained through a user calendar or other data source), or specifically input or set by a requester or rider for the specific route, for example, or in general. In one example, origination point 260 may be extremely congested or otherwise hard to access by a ride-share fleet vehicle, which could prevent or significantly increase a wait time for the user and a total trip time to arrive at destination 272. In such circumstances, a planned multimodal route may include directing the user to walk and/or take a scooter/bike to an intermediate and less congested location to meet a reserved ride-share vehicle, which would allow the user to arrive at destination 272 quicker than if the ride-share vehicle was forced to meet the user at origination point 260. It will be appreciated that numerous different transportation-relevant conditions may exist or dynamically appear or disappear along a planned route that may make it beneficial to use different modes of transportation to arrive at destination 272 efficiently, including changes in traffic congestion and/or other transportation-relevant conditions that occur mid-route, such as an accident along the planned route. Under such circumstances, management system 240 may be configured to adjust a modality or portion of the planned route dynamically in order to avoid or otherwise compensate for the changed conditions while the route is being traversed.

Figure 3A:
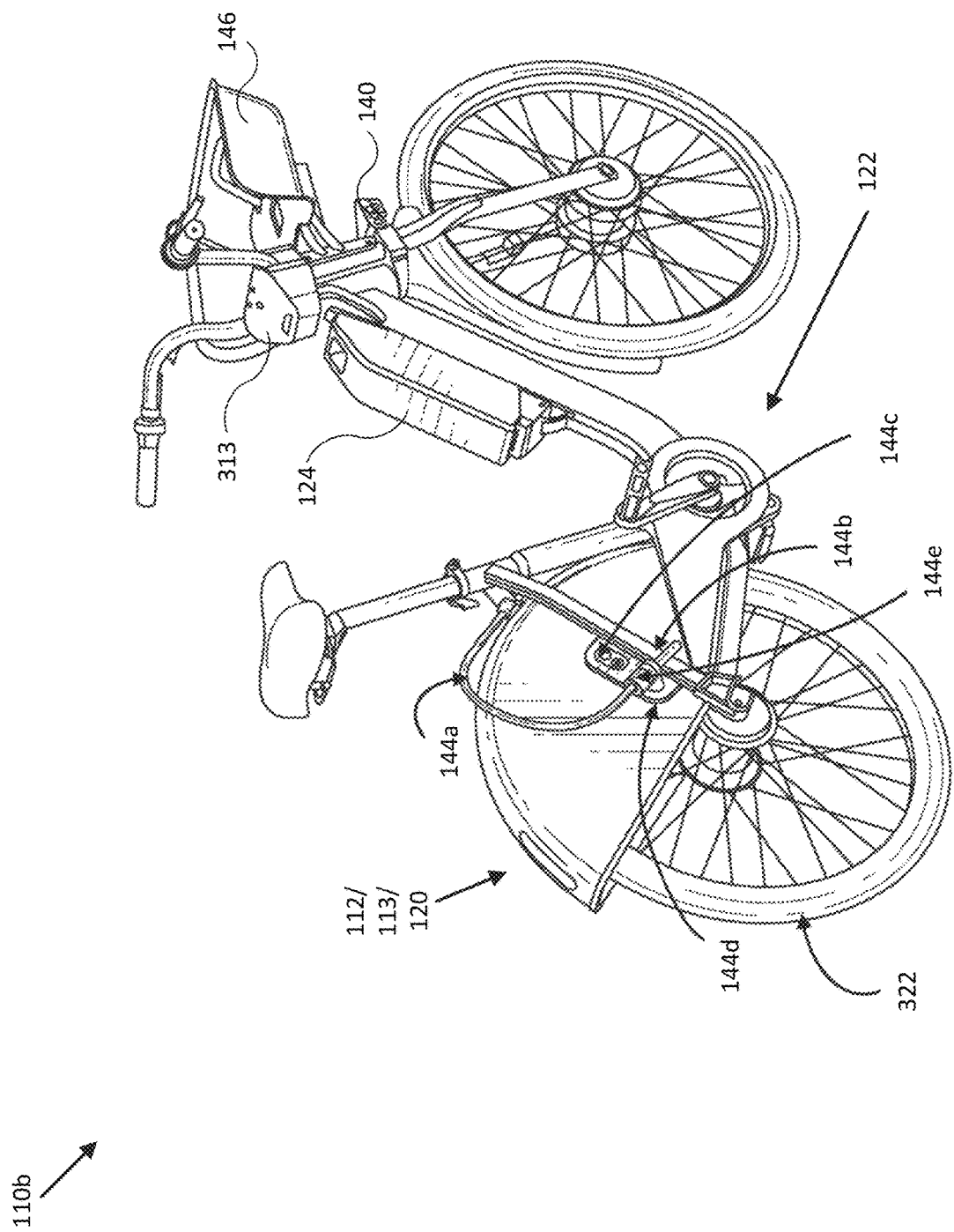
FIGS. 3A-C illustrate diagrams of micro-mobility fleet vehicles for use in a dynamic transportation matching system in accordance with embodiments of the disclosure.
Figure 3B:
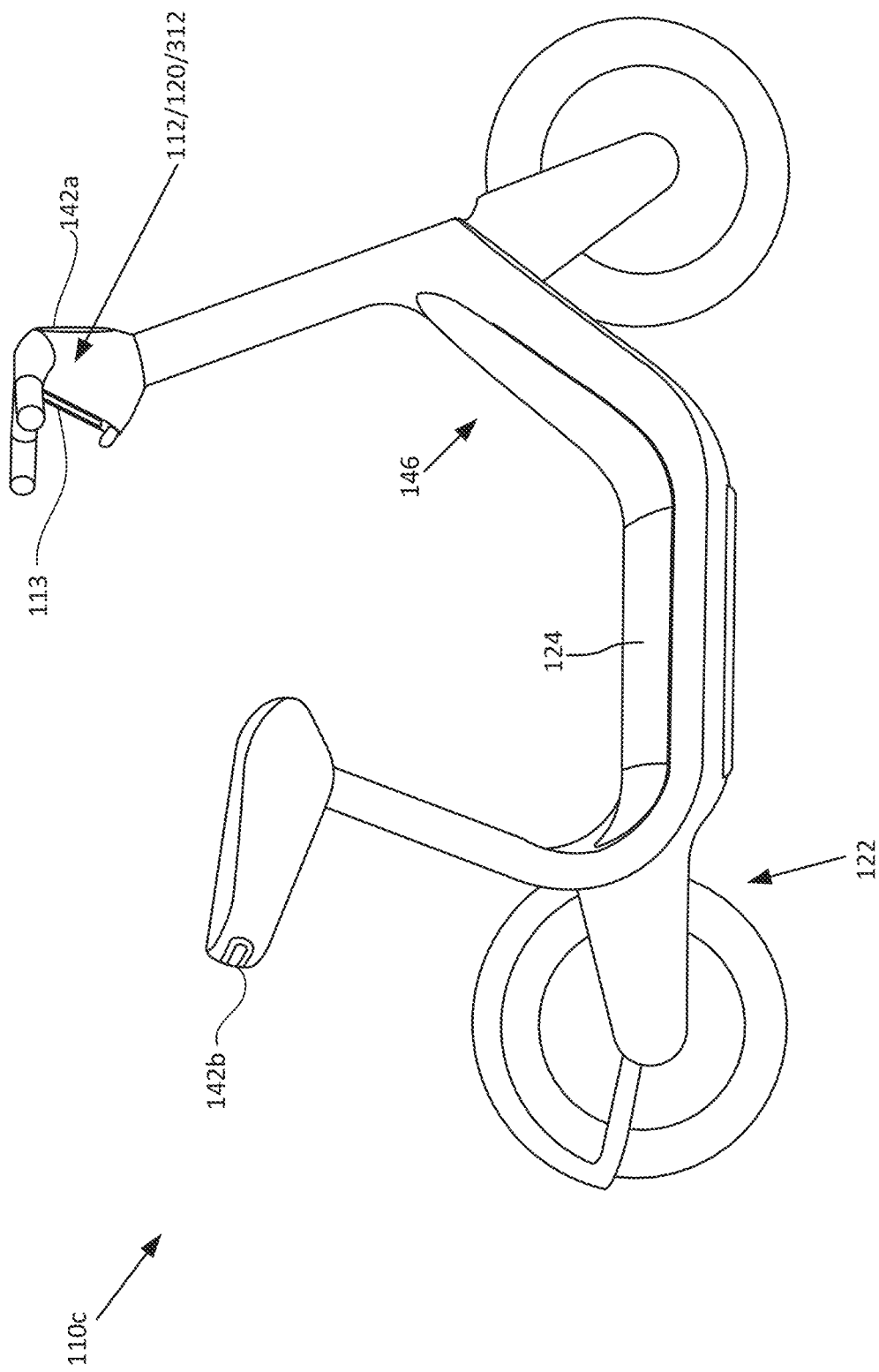
Figure 3C:
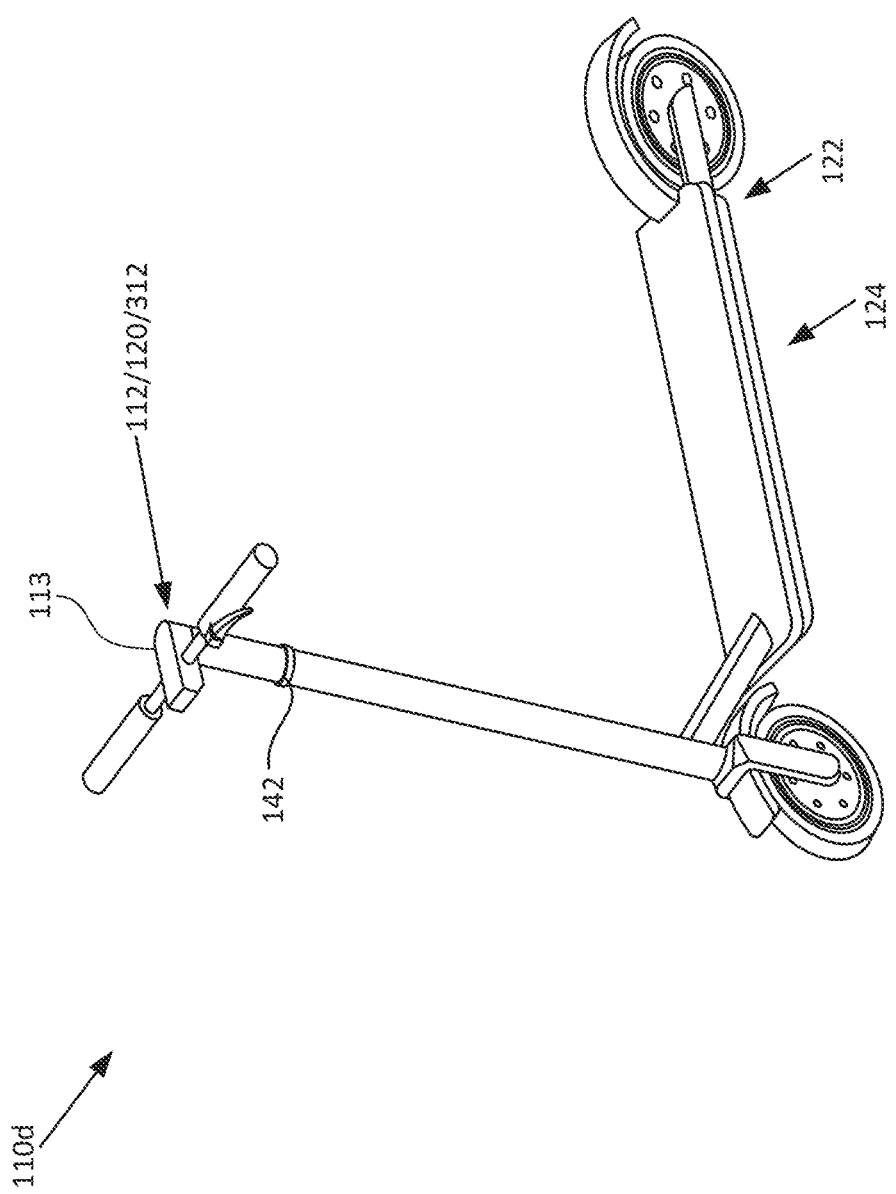

FIGS. 3A-C illustrate diagrams of micro-mobility fleet vehicles 110b, 110c, and 110d, which may be integrated with mobile mesh network provisioning systems in accordance with an embodiment of the disclosure. For example, fleet vehicle 110b of FIG. 3A may correspond to a motorized (e.g., electric and/or battery powered) bicycle that is integrated with the various elements of system 100 and may be configured to participate in dynamic transportation matching system 200 of FIG. 2. As shown, fleet vehicle 110b includes controller/user interface/wireless communications module 112/113/120 (e.g., integrated with a rear fender of fleet vehicle 110b), propulsion system 122 configured to provide motive power to at least one of the wheels (e.g., a rear wheel 322) of fleet vehicle 110b, battery 124 for powering propulsion system 122 and/or other elements of fleet vehicle 110b, docking mechanism 140 (e.g., a spade lock assembly) for docking fleet vehicle 110b at a docking station, user storage 146 implemented as a handlebar basket, and vehicle security device (e.g., an embodiment of vehicle security device 144 of FIG. 1), which may incorporate one or more of a locking cable 144a, a pin 144b coupled to a free end of locking cable 144a, a pin latch/insertion point 144c, a frame mount 144d, and a cable/pin holster 144e, as shown (collectively, vehicle security device 144). In some embodiments, controller/user interface/wireless communications module 112/113/120 may alternatively be integrated on and/or within a handlebar enclosure 313, as shown.

In some embodiments, vehicle security device 144 may be implemented as a wheel lock configured to immobilize rear wheel 322 of fleet vehicle 110b, such as by engaging pin 144b with spokes of rear wheel 322. In the embodiment shown in FIG. 3A, vehicle security device 144 may be implemented as a cable lock configured to engage with a pin latch on a docking station, for example, or to wrap around and/or through a secure pole, fence, or bicycle rack and engage with pin latch 144c. In various embodiments, vehicle security device 144 may be configured to immobilize fleet vehicle 110b by default, thereby requiring a requestor (e.g., a rider) to transmit a rental or reservation request to management system 240 (e.g., via user device 130) to reserve fleet vehicle 110b before attempting to use fleet vehicle 110b. The reservation request may identify fleet vehicle 110b based on an identifier (e.g., a QR code, a barcode, a serial number, etc.) presented on fleet vehicle 110b (e.g., such as by user interface 113 on a rear fender of fleet vehicle 110b). Once the reservation request is approved (e.g., payment is processed), management system 240 may transmit an unlock signal to fleet vehicle 110b (e.g., via network 250). Upon receiving the unlock signal, fleet vehicle 110b (e.g., controller 112 of fleet vehicle 110b) may release vehicle security device 144 and unlock rear wheel 322 of fleet vehicle 110b.

Fleet vehicle 110c of FIG. 3B may correspond to a motorized (e.g., electric and/or battery powered) sit-scooter that is integrated with the various elements of system 100 and may be configured to participate in dynamic transportation matching system 200 of FIG. 2. As shown in FIG. 3B, fleet vehicle 110c includes many of the same elements as those discussed with respect to fleet vehicle 110b of FIG. 3A. For example, fleet vehicle 110c may include user interface 113, propulsion system 122, battery 124, controller/wireless communications module/cockpit enclosure 112/120/312, user storage 146 (e.g., implemented as a storage recess), and operator safety measures 142a and 142b, which may be implemented as various types of headlights, programmable light strips, and/or reflective strips.

Fleet vehicle 110d of FIG. 3C may correspond to a motorized (e.g., electric and/or battery powered) stand or kick scooter that is integrated with the various elements of system 100 and may be configured to participate in dynamic transportation matching system 200 of FIG. 2. As shown in FIG. 3C, fleet vehicle 110d includes many of the same elements as those discussed with respect to fleet vehicle 110b of FIG. 3A. For example, fleet vehicle 110d may include user interface 113, propulsion system 122, battery 124, controller/wireless communications module/cockpit enclosure 112/120/312, and operator safety measures 140, which may be implemented as various types programmable light strips and/or reflective strips, as shown.

Figure 4B:
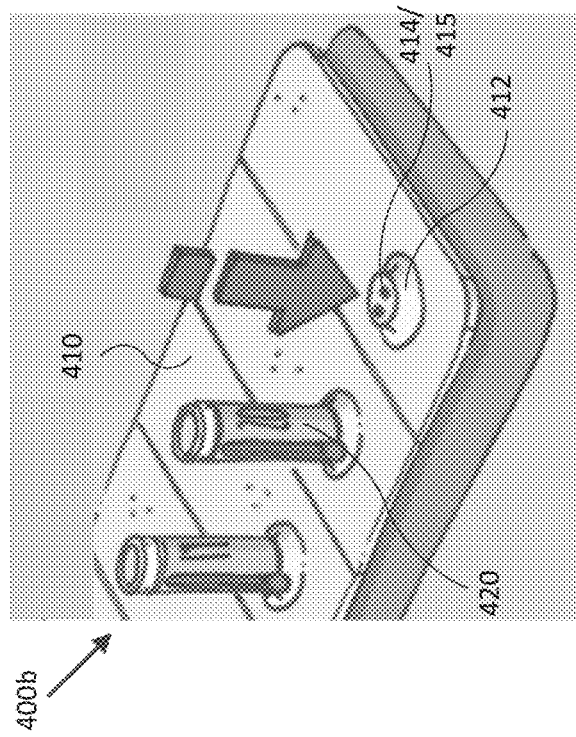
Figure 4C:
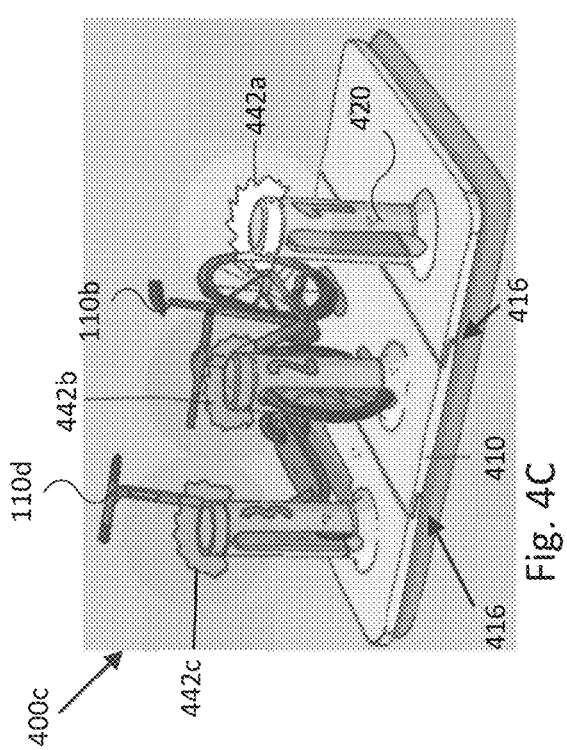
Figure 4A:
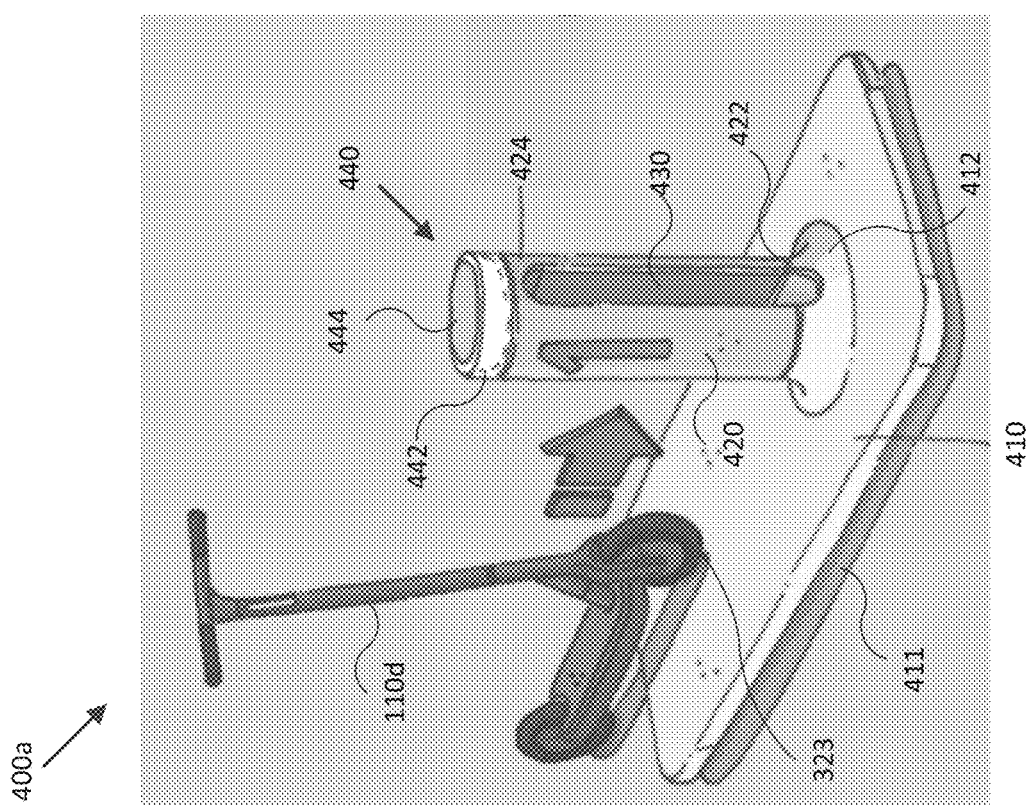

FIGS. 4A-J illustrate various elements of modular docking systems in accordance with an embodiment of the disclosure. For example, FIG. 4A shows kick scooter 110d docking with a modular micro-mobility docking system 400a. As shown in FIG. 4A, modular micro-mobility docking system 400a includes a base platform 410 supporting a modular station body 420, which includes a vehicle retention system 430 configured to secure kick scooter 110d to modular station body 420. In the embodiment illustrated by FIG. 4A, modular station body 420 is implemented as a pedestal docking station (e.g., a cylindrical pedestal docking station) including a base platform interface 422 disposed at a bottom surface of modular station body 420 that is configured to be physically secured to base platform 410 by a modular station body receptacle 412 disposed on a top surface of base platform 410, as shown. In various embodiments, a base platform interface (e.g., base platform interface 422) and/or a modular station body receptacle (e.g., modular station body receptacle 412) may be configured to secure a modular station body (e.g., modular station body 420) to base platform 410, such as via a station locking interface integrated with base platform interface 422 of modular station body 420 and/or integrated with modular station body receptacle 412 of base platform 410. In FIG. 4A, vehicle retention system 430 is implemented as an enclosed wheel slot through modular station body 420 and may include an internal mechanical clamp or collet to secure front wheel 323 of kick scooter 110d (and/or any other type of micro-mobility fleet vehicle) and/or provide charging power to a docked micro-mobility fleet vehicle, as described herein.

In some embodiments, modular station body 420 may include presentation interface 424 disposed at a top surface of modular station body 420 that is configured to physically support and/or provide electrical power to a station feature 440 (e.g., a programmable light element 442, an informational display 444, and/or a solar cell array). For example, programmable light element 442 may be implemented as a multicolored light strip configured to display or flash different colors depending on a status of modular station body 420 and/or a docked micro-mobility fleet vehicle. Similarly, informational display 444 may be implemented as an e-ink or other relatively low power pixel or video display configured to provide similar system element statuses (e.g., charging state, availability, reservation status, reservation identification) to a requester/rider and/or a fleet servicer/manager. In various embodiments, modular micro-mobility docking system 400a may include a sub-stabilization layer 411 disposed adjoining a bottom surface of base platform 410 that is made of a material configured to prevent damage to the base platform by physical impact and/or moisture ingress beneath the base platform, for example, and to prevent damage to any sub-surface below base platform 410, such as a public sidewalk, a business floor or walkway, or a road. In some embodiments, sub-stabilization layer 411 may be glued or laminated to the bottom surface of base platform 410 to facilitate easy deployment and retrieval of base platform 410 (e.g., such as during a fleet rebalancing process).

FIG. 4B illustrates a similar modular micro-mobility docking system 400b with multiple base platforms 410 and (pedestal docking station) modular station bodies 420 disposed adjoining each other along a least a portion of their peripheries in a docking system array. Additionally, FIG. 4B, shows that each modular station body receptacle 412 of each base platform 410 may include a station locking interface 414 configured to releasably secure modular station body 420 to base platform 410 and/or an electrical interface 415 configured to provide power to modular station body 420 (e.g., sourced from a public utility or a local business, as described herein). As used herein, to releasably secure may include a station locking interface (e.g., station locking interface 414) securing a modular station body (e.g., modular station body 420) to a base platform (e.g., base platform 410) and the station locking interface releasing the modular station body from the base platform, such as by engaging a collar clamp to a cylindrical locking extension (e.g., of any of modular station body 420 and/or base platform 410), as described herein.

In some embodiments, station locking interface 414 and/or electrical interface 415 may be integrated with each other, such as in a locking pogo connector assembly, where the interfaces are implemented as one or more cylindrical pins that engage releasably with modular station body receptacle 412. In various embodiments, features similar to station locking interface 414 and/or electrical interface 415 may be integrated with base platform interface 422, for example, and the remaining portions of a locking pogo connector assembly (e.g., locking cylinders and/or pins) may be integrated with and/or form station locking interface 414 and/or electrical interface 415, such that features integrated with modular station bodies 420 are configured to releasably secure modular station bodies 420 to base platform 410 (e.g., are configured to respond to application of a mechanical and/or electromechanical force to lock and/or unlock modular station body 420 to/from base platform 410). Control of station locking interface 414 and/or electrical interface 415 (e.g., locking, unlocking, enabling, disabling) may be implemented by a mechanical and/or electromechanical locking mechanism that may be made tamper resistant through a proprietary, physical-key locked, and/or encrypted fleet servicer interface, for example.

FIG. 4C illustrates a similar modular micro-mobility docking system 400c with multiple base platforms 410 and (pedestal docking station) modular station bodies 420 disposed adjoining each other along a least a portion of their peripheries in a docking system array. In particular, FIG. 4C shows platform interlock features 416 disposed along adjoining portions of the perimeters of adjoining base platforms 410, where platform interlock features 416 are configured to provide a predefined relative position and/or orientation of one base platform 410 relative to an adjoining base platform 410, as shown. In addition, FIG. 4C shows how programmable light element 442 may indicate an available docking station (e.g., programmable light effect 442a), a reserved docked micro-mobility fleet vehicle/bicycle 110b (e.g., programmable light effect 442b), and an available micro-mobility fleet vehicle/kick scooter 110d (e.g., programmable light effect 442c).

FIG. 4D shows a modular micro-mobility docking system 400d including a kiosk station 450 (e.g., a type of modular station body 420) implemented as a repair station that itself includes various service features, such as tire pump 458 and service tools 459, in addition to a vehicle retention system 430 (e.g., implemented as an enclosed wheel slot through a body of repair station 450 that may include an internal mechanical clamp or collet to secure and/or charge a docked micro-mobility fleet vehicle). Additionally, as shown in FIG. 4D, repair station 450 may include presentation interface 452 (e.g., a relatively high presentation interface) configured to support and/or power a station feature 454, such as programmable signage 456. In various embodiments, programmable signage 456 may be configured to indicate availability, status, vendor affiliation, and/or other characteristics of a modular micro-mobility docking system (e.g., modular micro-mobility docking system 400*d* of FIG. 4D and/or modular micro-mobility docking system 400*e* of FIG. 4E, as shown). FIG. 4E illustrates a similar modular micro-mobility docking system 400*e* with multiple base platforms 410, multiple (pedestal docking station) modular station bodies 420, and repair station 450 disposed adjoining each other in a typical deployment configuration.

FIG. 4F shows a modular micro-mobility docking system 400*f* including a (pedestal docking station) modular station body 420 and a relatively large station feature 440 supported by presentation interface 424, such that the assembly is interchangeable as a kiosk station (e.g., similar to kiosk station 450 in FIG. 4D). In the embodiment shown in FIG. 4F, station feature 440 includes programmable light element 442, a community post board portion, a street signage portion, and programmable signage 456 all integrated as a single station feature supported and/or powered by modular station body 420. In some embodiments, each portion of station feature 440 may couple with adjoining portions using a presentation interface similar to presentation interface 424, such as in a serial or stacked presentation interface topology or arrangement.

FIG. 4G illustrates a variety of different kiosk stations 450*a-e* that may be mated with base platforms 410 using the same or similar station locking interface 412 to that shown in FIG. 4A. For example, kiosk station 450*a* is shown implemented as a training bike station, kiosk station 450*b* is shown implemented as a periscope viewing station, kiosk station 450*c* is shown implemented as a soft food (e.g., ice cream) dispensary station, kiosk station 450*d* is shown implemented as a hard food (e.g., gumball) dispensary station, and kiosk station 450*e* is shown implemented as a bench seating station.

FIG. 4H shows bicycle 110*b* docking with modular micro-mobility docking system 400*h* using a cable instead of a front wheel. As shown in FIG. 4A, modular micro-mobility docking system 400*h* includes modular station body receptacle 412 of base platform 410 supporting (pedestal docking station) modular station body 420, which includes vehicle retention system 430 configured to secure bicycle 110*b* to modular station body 420. In the embodiment illustrated by FIG. 4H, vehicle retention system 430 is implemented as a locking cable receptacle 432 in modular station body 420 and may include an internal locking mechanism to secure pin 144*b* of locking cable 144*a* for bicycle 110*b* (and/or any other type of micro-mobility fleet vehicle) and/or provide charging power to a docked micro-mobility fleet vehicle, as described herein. FIG. 4I illustrates a similar modular micro-mobility docking system 400*i* where vehicle retention system 430 is implemented with multiple locking cable receptacles 432-1 and 432-2 each configured to secure respective pins 144*b*-1 and 144*b*-2 of associated locking cables and docked micro-mobility fleet vehicles, as shown.

In FIG. 4J, modular micro-mobility docking system 400*j* includes modular station body receptacle 412 of base platform 410 supporting (pedestal docking station) modular station body 420, which is shown to include vehicle retention system 430 implemented as a retractable locking cable 434 (e.g., retracting within modular station body 420) and locking pogo connector assembly 436 configured to be secured to a micro-mobility fleet vehicle (e.g., with a locking orifice similar to pin latch/insertion point 144*c* in FIG. 3A) to modular station body 420. As shown in FIG. 4K, locking pogo connector assembly 436 may be implemented with cylindrical locking assembly 337 and/or electrical interface assembly 438 to secure a micro-mobility fleet vehicle and/or provide charging power to a docked micro-mobility fleet vehicle, as described herein. FIG. 4L illustrates a similar modular micro-mobility docking system 400*l* where vehicle retention system 430 is implemented with multiple retractable cables 434-1 and 434-2 each configured to secure respective micro-mobility fleet vehicles, as shown.

Figure 5A:
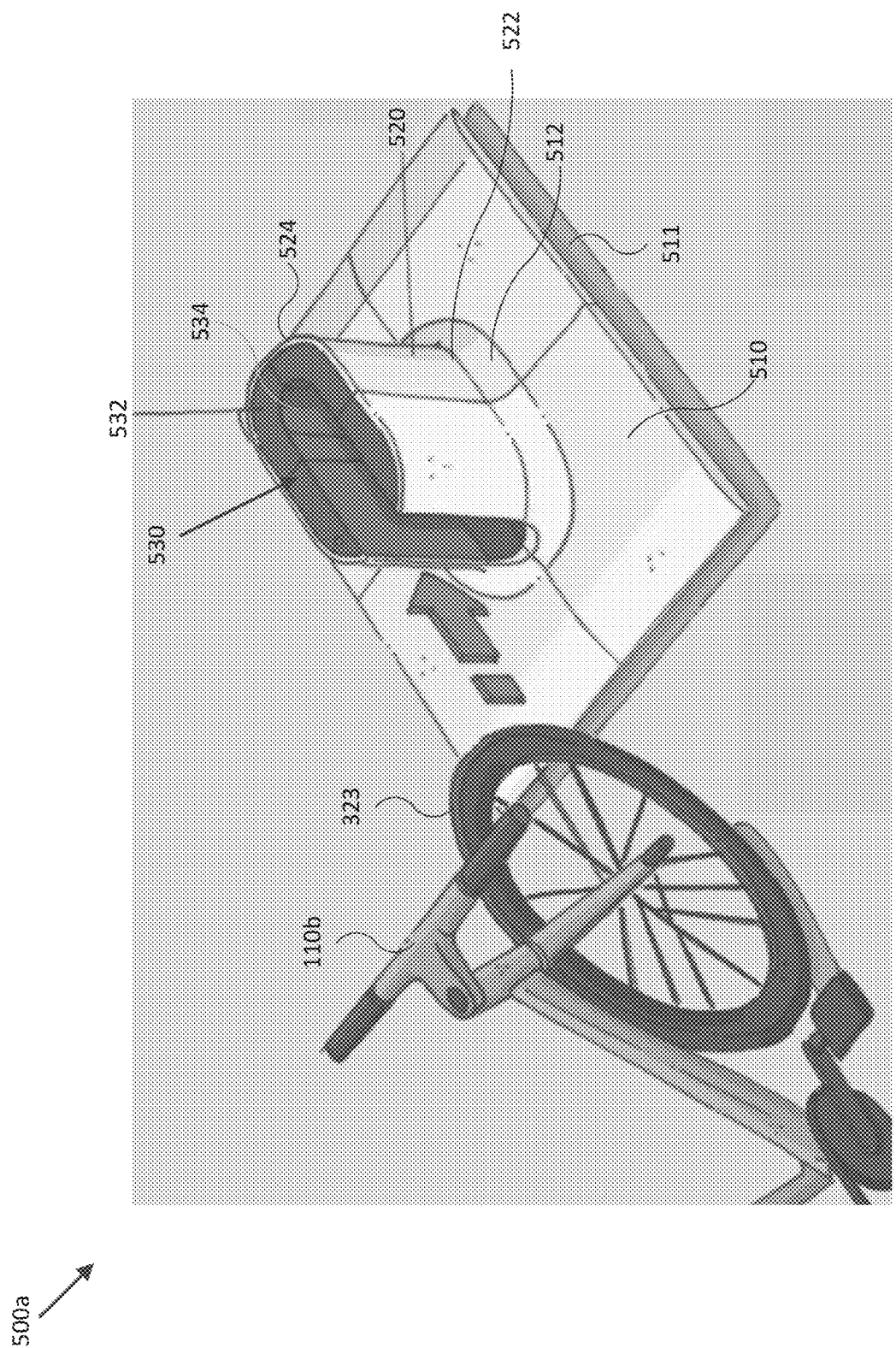
FIGS. 5A-C illustrate various elements of a modular docking system in accordance with an embodiment of the disclosure.
Figure 5B:
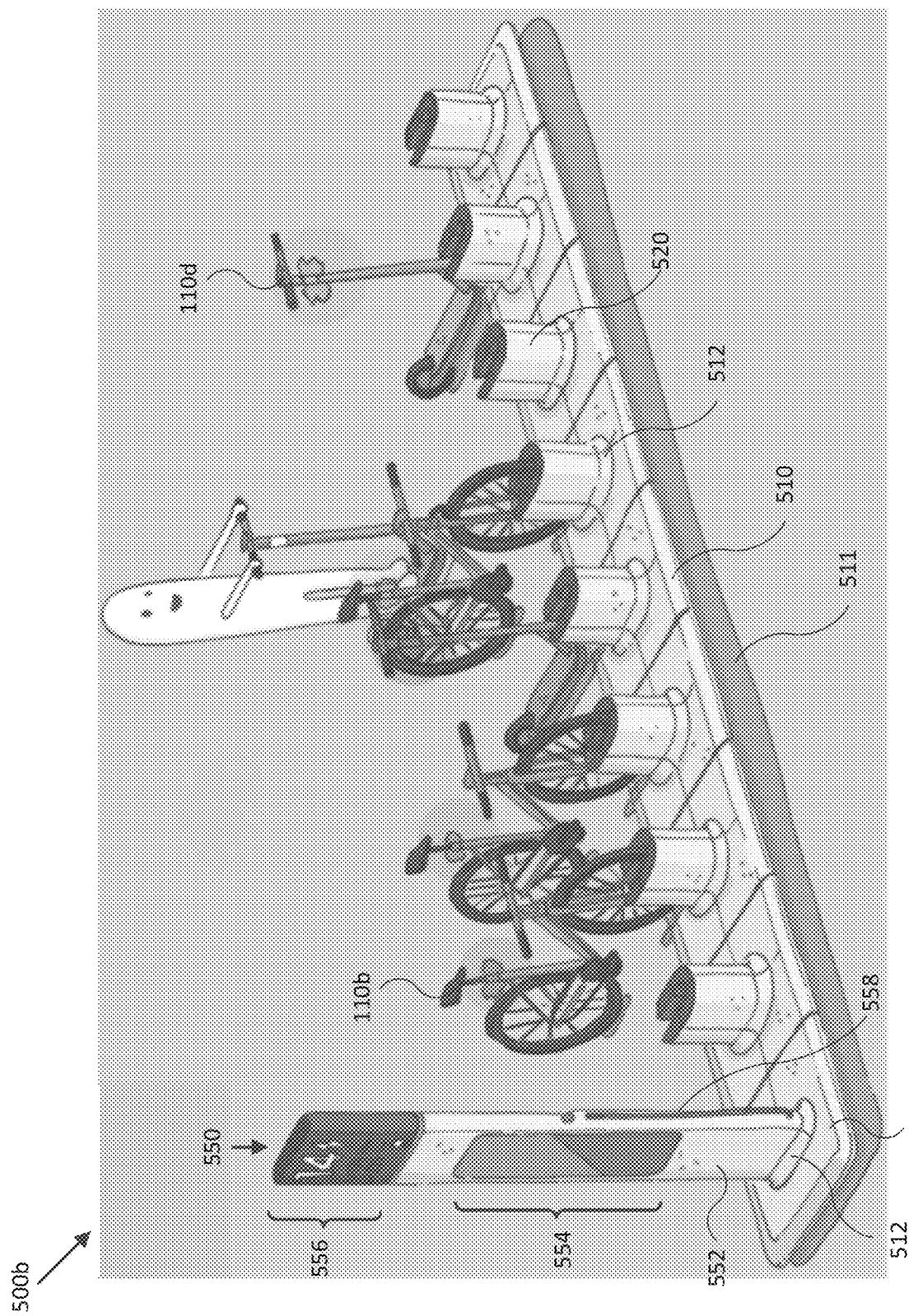
Figure 5C:
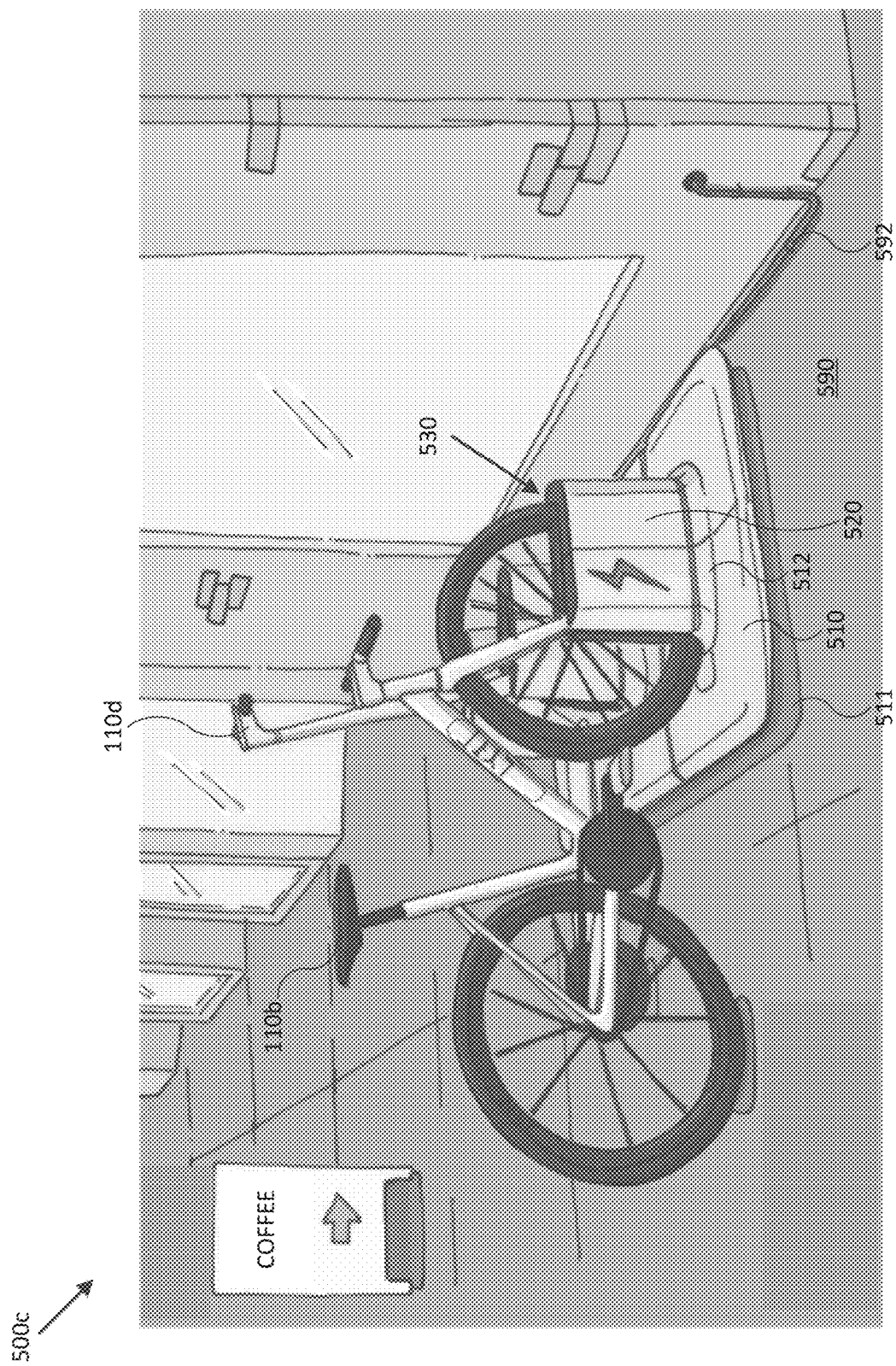

FIGS. 5A-C illustrate various elements of a modular docking system in accordance with an embodiment of the disclosure. For example, FIG. 5A shows bicycle 110*b* docking with a modular micro-mobility docking system 500*a*. As shown in FIG. 5A, modular micro-mobility docking system 500*a* includes a base platform 510 supporting a modular station body 520, which includes a vehicle retention system 530 configured to secure bicycle 110*b* to modular station body 520. In the embodiment illustrated by FIG. 5A, modular station body 520 is implemented as a pedestal docking station (e.g., roughly an elliptic cylindrical or stadium pedestal docking station) including a base platform interface 522 disposed at a bottom surface of modular station body 520 that is configured to be physically secured to base platform 510 by a modular station body receptacle 512 disposed on a top surface of base platform 510, as shown. In various embodiments, base platform interface 522 and/or modular station body receptacle 512 may be configured to secure modular station body 520 to base platform 510, such as via a station locking interface integrated with base platform interface 522 of modular station body 520 and/or integrated with modular station body receptacle 512 of base platform 510. In FIG. 5A, vehicle retention system 530 is implemented as a relatively low-profile or short partial wheel recess 534 extending partially through a long axis of modular station body 520 and may include a mechanical clamp or collet 532 to secure front wheel 323 of bicycle 110*b* (and/or any other type of micro-mobility fleet vehicle) and/or provide charging power to a docked micro-mobility fleet vehicle, as described herein. In some embodiments, modular station body 520 may be used to provide a different type or level of wheel stability, security, and/or charging interface, for example, or a different type or shape of presentation interface 524, as compared to modular station body 420 of FIG. 4A. In various embodiments, modular micro-mobility docking system 500*a* may include a sub-stabilization layer 511 similar to sub-stabilization layer 411 in FIG. 4A.

FIG. 5B illustrates a similar modular micro-mobility docking system 500*b* with multiple base platforms 510, multiple (stadium pedestal docking station) modular station bodies 520, and kiosk station 550 disposed adjoining each other in a typical deployment configuration (e.g., which may include platform interlock features similar to platform interlock features 416 in FIG. 4C). In FIG. 5B, kiosk station 550 is implemented as a repair and/or information station that includes various service features, such as tire pump 558, in addition to various information features, such as video display 554 and kiosk assembly 556, which may include a programmable light element, a dot matrix display, and/or a solar cell array, as shown. Moreover, as shown in FIG. 5B, modular station bodies 520 may be sized to be universal such that they support docking of multiple different types of micro-mobility fleet vehicles, as shown. FIG. 5C illustrates a similar modular micro-mobility docking system 500c providing secure docking and charging for both bicycle 110b and kick scooter 110d. For example, modular micro-mobility docking system 500c may be deployed adjacent a business thoroughfare, such as on sidewalk 590, and be coupled to a business power receptacle or a public utility via power interface 592 (e.g., an electrical cable/conduit). In alternative embodiments, power interface 592 may be routed beneath base platform 510 (e.g., or any base platform of any modular micro-mobility docking system described herein).

Figure 6B:
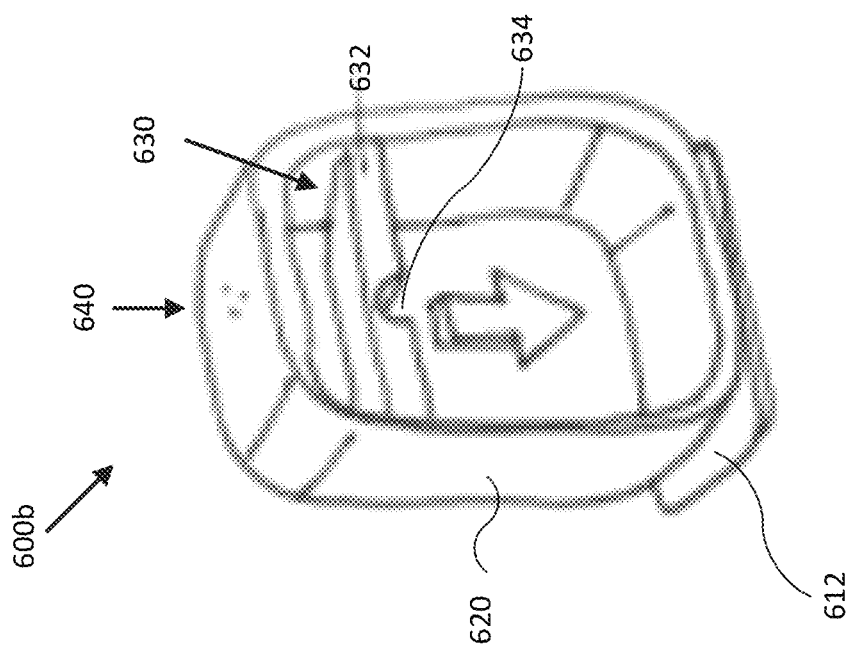
FIGS. 6A-B illustrate various elements of a modular docking system in accordance with an embodiment of the disclosure.
Figure 6A:
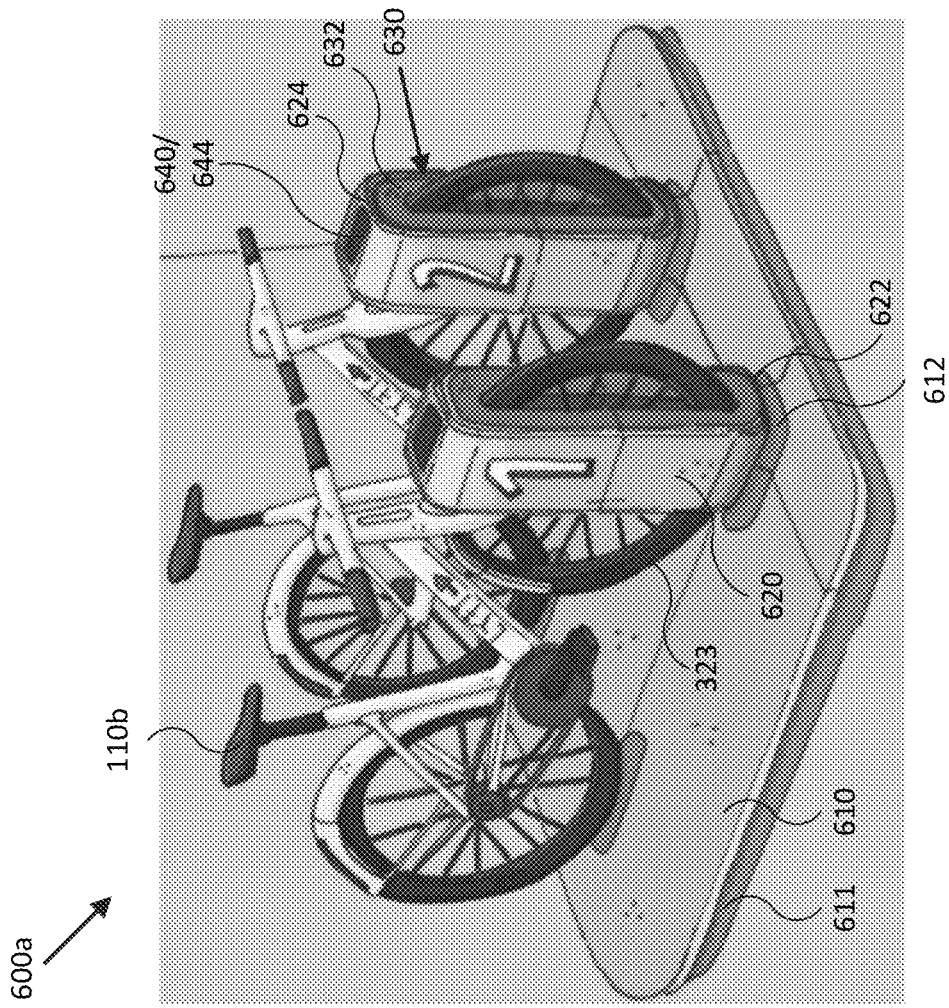

FIGS. 6A-B illustrate various elements of a modular docking system in accordance with an embodiment of the disclosure. For example, FIG. 6A shows bicycles 110b docking with a modular micro-mobility docking system 600a. As shown in FIG. 6A, modular micro-mobility docking system 600a includes a base platform 610 supporting a modular station body 620, which includes a vehicle retention system 630 configured to secure each bicycle 110b to each modular station body 620. In the embodiment illustrated by FIG. 6A, modular station body 620 is implemented as a loop docking station including a base platform interface 622 disposed at a bottom surface of modular station body 620 that is configured to be physically secured to base platform 610 by a modular station body receptacle 612 disposed on a top surface of base platform 610, as shown. In various embodiments, base platform interface 622 and/or modular station body receptacle 612 may be configured to secure modular station body 620 to base platform 610, such as via a station locking interface integrated with base platform interface 622 of modular station body 620 and/or integrated with modular station body receptacle 612 of base platform 610. In FIG. 6A, vehicle retention system 630 is implemented as an enclosed wheel slot through modular station body 620 and includes mechanical clamp or collet 632 to secure front wheel 323 of bicycles 110b (and/or any other type of micro-mobility fleet vehicle) and/or provide charging power to a docked micro-mobility fleet vehicle, as described herein. In some embodiments, a visible surface of mechanical clamp or collet 632 may be implemented with a programmable light strip or element to indicate a status of the associated fleet vehicle and/or modular station body.

In some embodiments, modular station body 620 may be used to provide a different type or level of wheel stability, security, and/or charging interface, for example, or a different type or shape of presentation interface 624 (e.g., shown supporting station feature/solar cell array 640/644), as compared to modular station body 420 of FIG. 4A and/or modular station body 520 of FIG. 5A. In various embodiments, modular micro-mobility docking system 600a may include a sub-stabilization layer 611 similar to sub-stabilization layer 411 in FIG. 4A and/or sub-stabilization layer 511 in FIG. 5A. FIG. 6B illustrates a similar modular micro-mobility docking system 600b, where mechanical collet 632 of vehicle retention system 630 is implemented as an adjustable mechanical collet (e.g., an adjustable-height mechanical collet) configured to move vertically to receive (or block docking of) wheels of different heights. In various embodiments, such adjustments may be performed as part of a docking system deployment process, as described herein.

Figure 7A:
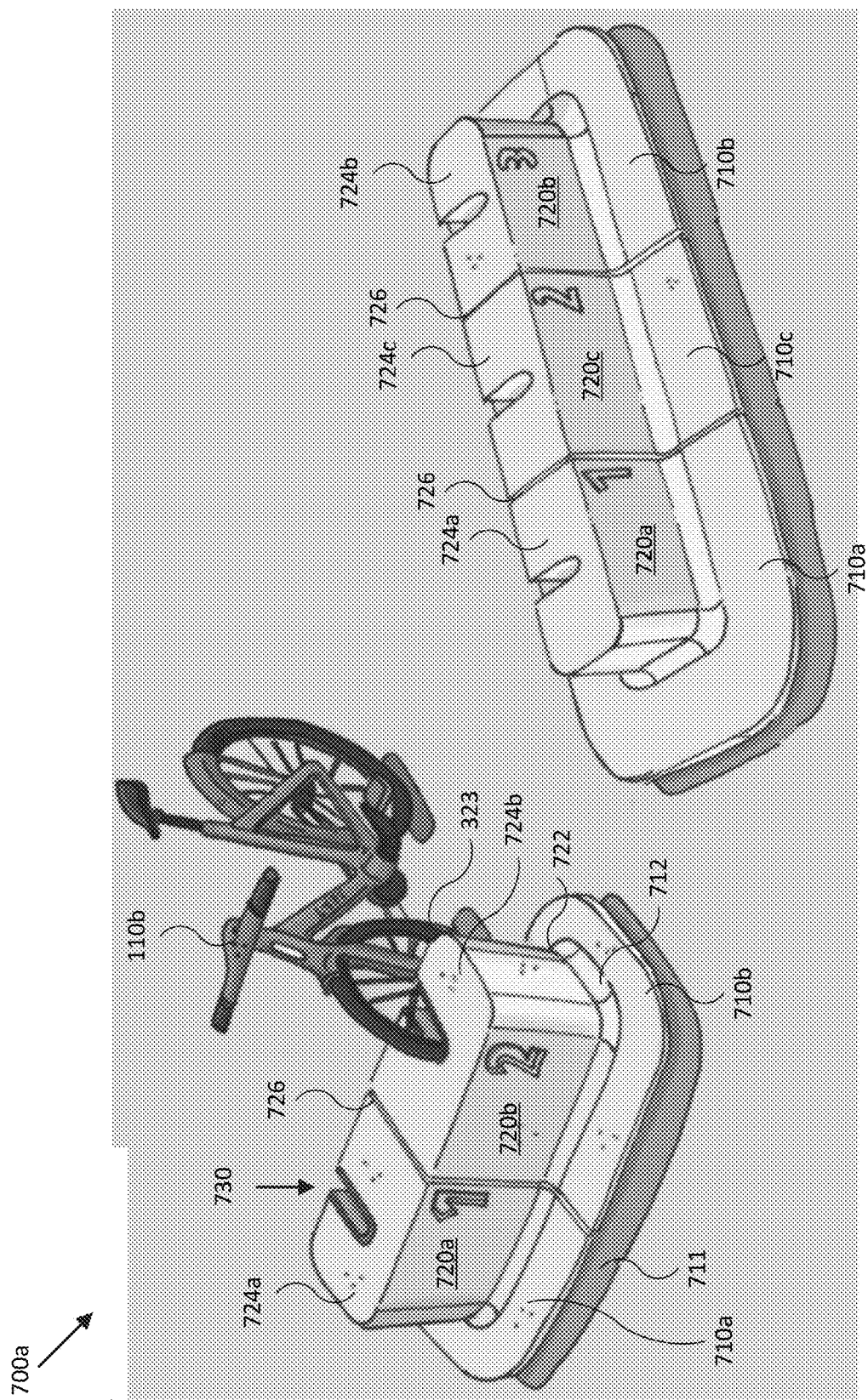
FIGS. 7A-B illustrate various elements of a modular docking system in accordance with an embodiment of the disclosure.
Figure 7B:
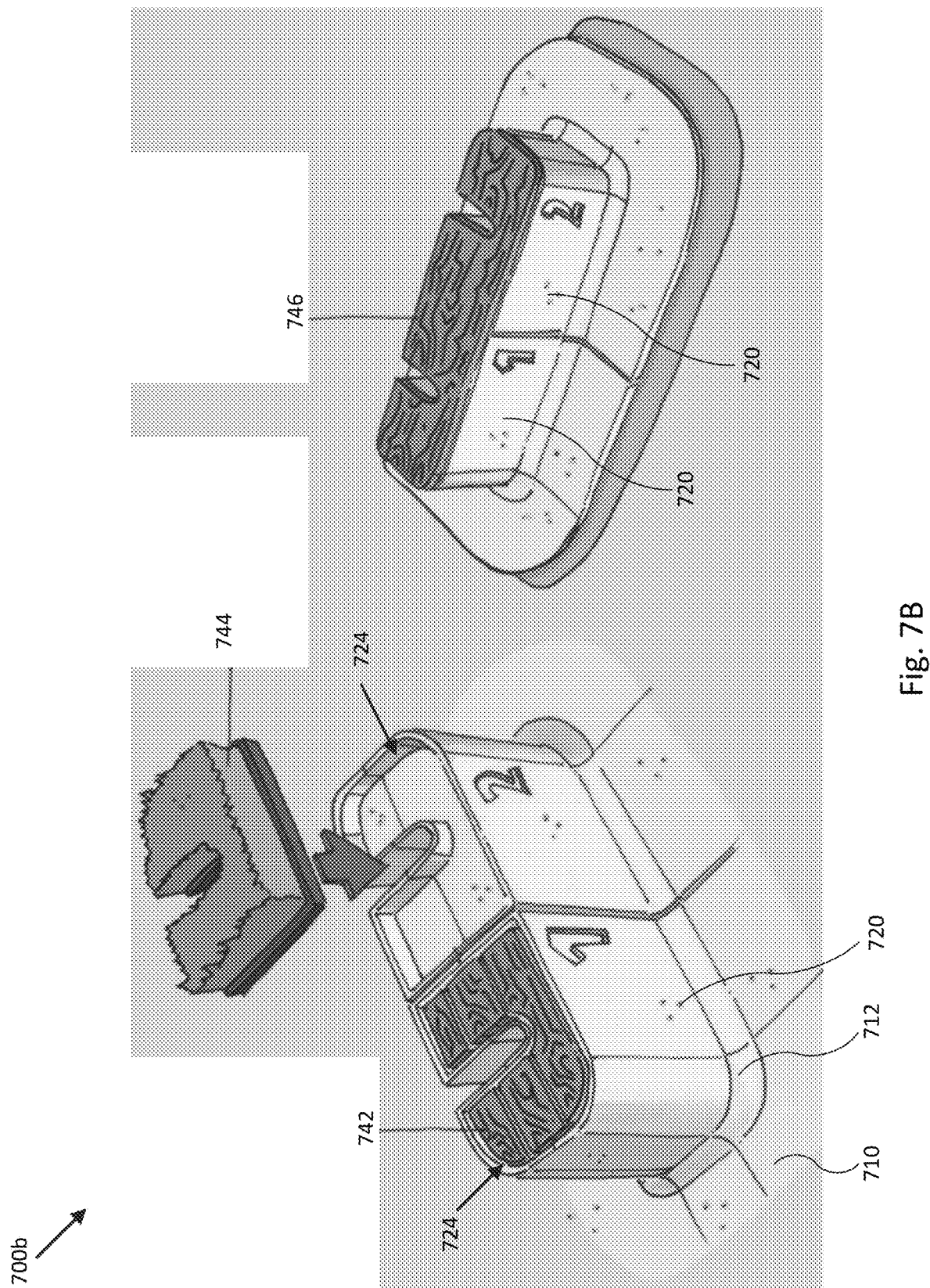

FIGS. 7A-B illustrate various elements of a modular docking system in accordance with an embodiment of the disclosure. For example, FIG. 7A shows bicycle 110b docking with a modular micro-mobility docking system 700a. As shown in FIG. 7A, modular micro-mobility docking system 700a includes various connected and disconnected base platforms 710a-c supporting various respective modular station bodies 720a-c, each of which includes a vehicle retention system 730 configured to secure bicycle 110b to one of modular station bodies 720a-c. In the embodiment illustrated by FIG. 7A, modular station bodies 720a-c are implemented as roughly cuboid docking stations each including a base platform interface 722 disposed at a bottom surface of each modular station body 720a-c that is configured to be physically secured to base platforms 710a-c by a corresponding modular station body receptacle 712 disposed on a top surface of base platforms 710a-c, as shown. In various embodiments, base platform interface 722 and/or modular station body receptacle 712 may be configured to secure modular station body 720 to base platform 710, such as via a station locking interface integrated with base platform interface 722 of modular station body 720 and/or integrated with modular station body receptacle 712 of base platform 710. In FIG. 7A, vehicle retention system 730 is implemented as a relatively low-profile or short partial wheel recess extending part way through modular station body 720 and may include a mechanical clamp or collet to secure front wheel 323 of bicycle 110b (and/or any other type of micro-mobility fleet vehicle) and/or provide charging power to a docked micro-mobility fleet vehicle, as described herein. In various embodiments, modular micro-mobility docking system 700a may include a sub-stabilization layer 711 similar to other sub-stabilization layers described herein.

In the embodiment shown in FIG. 7A, base platforms 710a and 710b are shown as asymmetrical with respect to the orientation of vehicle retention system 730, such that base platforms 710a and 710b can facilitate the formation of a flush join 726 between modular station bodies 720a and 720b, for example, or between each of modular station bodies 720a and 720b and modular station body 724c coupled to symmetrical base platform 710c. Moreover, such asymmetry in the shape of modular station bodies 720a and 720b may be used to provide safely and/or aesthetically rounded corners at ends of modular micro-mobility docking system 700a.

In some embodiments, modular station bodies 720a-c may be used to provide a different type or level of wheel stability, security, and/or charging interface, for example, or a different type or shape of presentation interfaces 724a-c, as compared to other modular station bodies described herein. For example, as shown in FIG. 7B, modular micro-mobility docking system 700b includes a variety of station features at least partially facilitated by the shape and arrangement of presentation interfaces 724, such as bench feature 742, garden feature 744, and extended bench feature 746.

FIG. 8 illustrates a demark station 800 incorporating various elements of a modular docking system in accordance with an embodiment of the disclosure. For example, demark station 800 may be viewed as a monolithic embodiment of modular micro-mobility docking system 700a of FIG. 7 with a selection of additional station features selected to render demark station 800 a more permanent or community-centric installation. For example, as shown in FIG. 8, demark station 800 includes multiple interconnected base platforms 810, each with their own modular station body 820 and vehicle retention system 830 securing one of bicycles 110b, roughly in a linear array of modular station bodies/vehicle retention systems 830. In addition, demark station 800 includes two bench features 842 disposed along an interior portion of the linear array, and demark station 800 includes two shade support pillars/station features 848 disposed at opposite ends of the linear array, where shade support pillars 848 provide structural support for shade structure 850. In the embodiment shown in FIG. 8, shade structure 850 includes a solar cell array 852 disposed on an upper surface of shade structure 850 and two water collection features 854 (e.g., funnels) disposed above and funneling water into interior water reservoirs within shade support pillars 848. In addition, shade support pillars 848 include their own station features 849, which may include power delivery ports (e.g., sourced from solar cell array 852), water delivery nozzles (e.g., sourced from water collection features 854), ambient lighting (e.g., powered by solar cell array 852 and/or an integrated storage battery). In alternative embodiments, water sourced from water collection features 854 may be used to water a garden feature associated with demark station 800.

FIGS. 9A-C illustrate a rebalancing system 900 incorporating various elements of a modular docking system in accordance with an embodiment of the disclosure. In particular, FIG. 9A-C show different stages 900a-c of deployment of rebalancing system 900. For example, FIG. 9A shows rebalancing system 990 at a transport stage 900a of deployment in the form of a container 991 (e.g., a shipping container) with closed and secured walls 992. FIG. 9B shows rebalancing system 990 at an initiation stage 900b of deployment, where walls 992 of container 991 are being extended to provide access to interior 994 and to reveal top surface features, such as solar cell array 952. FIG. 9C shows rebalancing system 990 at a deployed stage 900c, where walls 992 of container 991 have been fully extended to form base platforms 910, which are fitted with modular station bodies 920 at modular station body receptacles 912. As shown in FIG. 9C, each modular station body 920 includes at least one (or many) vehicle retention systems each receiving one of kick scooters 110d or bicycles 110b and configured to form a linear array of docked micro-mobility fleet vehicles. In particular embodiments, modular station bodies 920 may be implemented as relatively wide loop docking stations each with an array (e.g., a linear array) of a plurality of vehicle retention systems similar to vehicle retention system 630 of FIGS. 6A-B. In some embodiments, interior 994 may include an optional kiosk business station 996, as shown.

In various embodiments, rebalancing system 900 may be configured to return to transport stage 900a of FIG. 9A by retracting walls 992 of container 991 and folding modular station bodies 920 and/or any docked micro-mobility fleet vehicles into interior 994 for easy retrieval and/or redeployment. For example, a fleet manager/servicer may rebalance a particular transportation service territory by deploying an empty rebalancing system 900 in an area with too many micro-mobility fleet vehicles, docking or encouraging riders to dock available micro-mobility fleet vehicles to modular station bodies 920, capturing the docked modular station bodies 920 within interior 994 by retracting walls 992, and redeploying rebalancing system 900 (e.g., and its captured micro-mobility fleet vehicles) to a different area of the transportation service territory with too few micro-mobility fleet vehicles.

Figure 10:
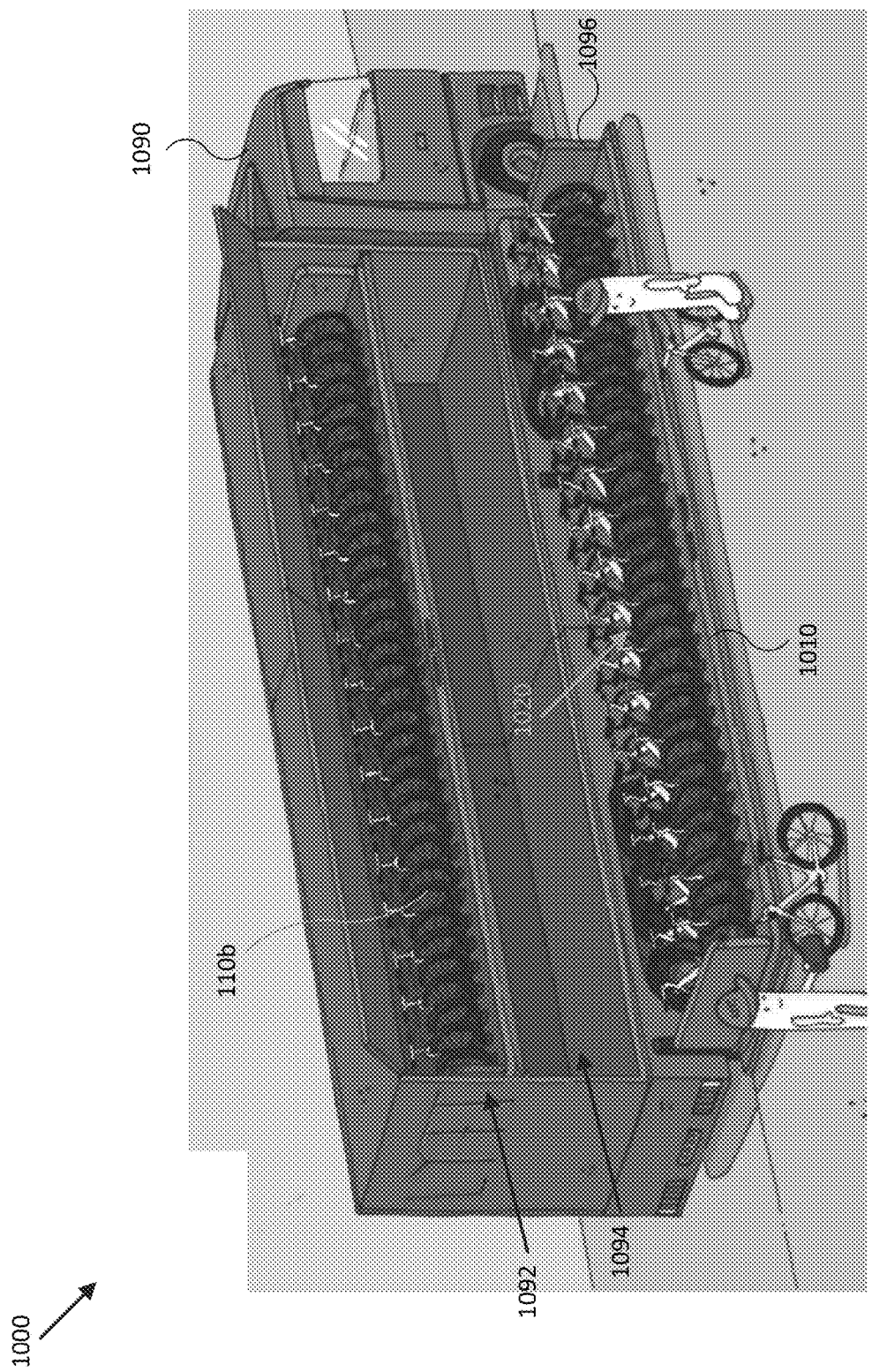
FIG. 10 illustrates a rebalancing system incorporating various elements of a modular docking system in accordance with an embodiment of the disclosure.

FIG. 10 illustrates rebalancing system 1000 incorporating various elements of a modular docking system in accordance with an embodiment of the disclosure. For example, as shown in FIG. 10, rebalancing system 1000 includes delivery vehicle 1090 including multiple storage slots 1092 and 1094 each configured to enclose a micro-mobility fleet vehicle array tray 1096. Each micro-mobility fleet vehicle array tray 1096 may be deployed to provide one or more base platforms 1010, each of which may be coupled to associated modular station bodies 1020. Similar to modular station bodies 920 of rebalancing system 900, each module station body 1020 may include at least one (or many) vehicle retention systems each receiving one of bicycles 110b (e.g., and/or any other micro-mobility fleet vehicle). In particular embodiments, modular station bodies 1020 may be implemented as relatively wide loop docking stations each with an array (e.g., a linear array) of a plurality of vehicle retention systems similar to vehicle retention system 630 of FIGS. 6A-B.

In typical operation, a fleet manager/servicer may rebalance a particular transportation service territory by determining a rebalancing strategy (e.g., based on density of micro-mobility fleet vehicles and requestors), transporting rebalancing system 1000 to an area with too few or too many micro-mobility fleet vehicles as determined by the rebalancing strategy, deploying one or more micro-mobility fleet vehicle array trays 1096 with open or filled docking stations, as appropriate to the determined rebalancing strategy, and deploying docked micro-mobility fleet vehicles or retrieving returned micro-mobility fleet vehicles, in accordance with the determined rebalancing strategy. Similar systems and processes may be used to deploy, retrieve, and/or rebalance modular micro-mobility fleet vehicle docking systems and/or system elements, as described herein.

Figure 11:
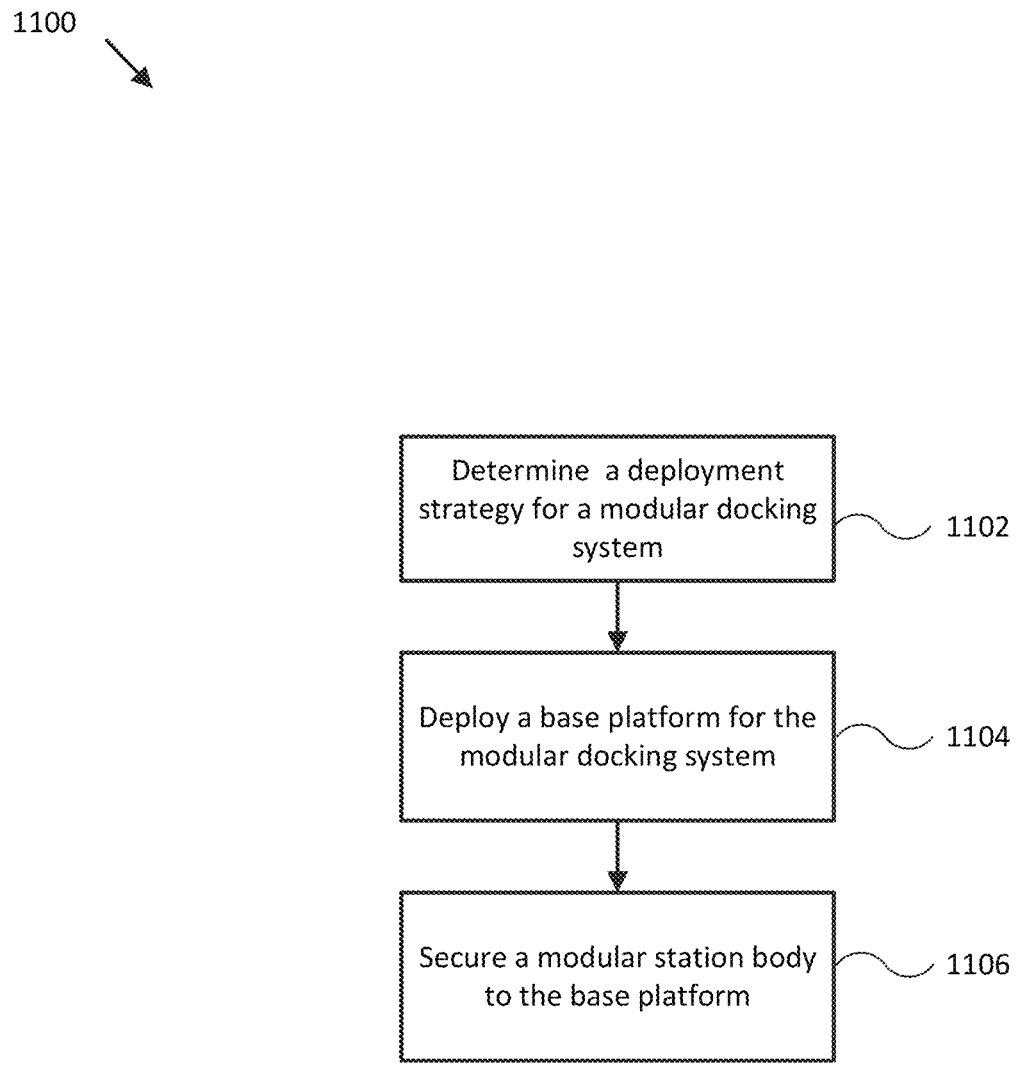
FIG. 11 illustrates a flow diagram of a process to provide a modular docking system in accordance with an embodiment of the disclosure.

FIG. 11 illustrates a flow diagram of a process 1100 to provide a modular docking system in accordance with an embodiment of the disclosure. It should be appreciated that any step, sub-step, sub-process, or block of process 1100 may be performed in an order or arrangement different from the embodiments illustrated by FIG. 11. For example, in other embodiments, one or more blocks may be omitted from or added to the process. Furthermore, block inputs, block outputs, various sensor signals, sensor information, calibration parameters, and/or other operational parameters may be stored to one or more memories prior to moving to a following portion of a corresponding process. Although process 1100 is described with reference to systems, processes, control loops, and images described in reference to FIGS. 1-10, process 1100 may be performed by other systems different from those systems, processes, control loops, and images and including a different selection of electronic devices, sensors, assemblies, mobile structures, and/or mobile structure attributes, for example.

In block 1102, a deployment strategy for a modular docking system is determined. For example, management system 240 may be configured to determine a time of deployment, a location of deployment, a type and/or number of modular station bodies to deploy, and/or a number of fleet vehicles to deploy. In various embodiments, management system 240 may determine a modular docking system deployment strategy based, at least in part, on one or more of a present or predicted requestor population and/or fleet vehicle spatial distribution across or within a designated transportation service territory, a rate of change of requestor population and/or fleet vehicle availability, a rebalancing system availability (e.g., spatial and/or temporal), and/or other deployment strategy parameters. For example, management system 240 may be configured to determine such deployment strategy parameters based on present or prior recorded requests, locations of requests, or time of requests, the time of day, present or prior fleet vehicle locations and/or charge statuses (e.g., reported as fleet status data), present or predicted weather conditions within the designated transportation service territory, present or prior rebalancing system availabilities, docking station statuses (e.g., provided by embodiments of modular docking systems described herein), and/or other fleet status characteristics, as described herein.

In block 1104, a base platform for a modular docking system is deployed. For example, management system 240 may be configured to transmit instructions to a fleet servicer to transport a base platform to a deployment location determined in block 1102, at a deployment time determined in block 1102, and/or according to one or more other deployment strategies determined in block 1102. In some embodiments, a modular docking deployment system similar to rebalancing system 1000 including a plurality of deployable base platforms may be configured to receive such instructions from a fleet servicer (e.g., management system 240), transport the plurality of deployable base platforms to the deployment location determined in block 110, and deploy a base platform onto a sidewalk or business premises associated with the determined deployment location and/or in accord with other deployment strategies determined in block 1102. In other embodiments, a modular docking deployment system similar to rebalancing system 990, implemented as a monolithic transportable container including micro-mobility fleet vehicles and/or empty docking stations with associated base platforms, may be transported (e.g., by a delivery truck accepting instructions from management system 240) to such deployment location and/or in accord with other deployment strategies determined in block 1102 and/or deployed, as described herein. Upon completion of a deployment, a modular docking deployment system may transmit a completion status (e.g., a successful completion status, a partial completion status, a failed completion status, a repair or replacement status) to management system 240.

In block 1106, a modular station body is secured to a base platform for a modular docking system. For example, management system 240 may be configured to transmit instructions to a fleet servicer to retrieve a type and/or number of modular station bodies determined in block 1102, position one of the retrieved modular station bodies over a corresponding modular station body receptacle in the base platform deployed in block 1104, and secure the one of the retrieved modular station bodies to the modular station body receptacle.

In some embodiments, a modular docking deployment system similar to rebalancing system 1000 including a plurality of deployable modular station bodies may be configured to receive such instructions from a fleet servicer (e.g., management system 240), transport the plurality of deployable modular station bodies to the base platform deployed in block 1104, position a selected one of the plurality of deployable modular station bodies over the base platform, and secure the selected modular station body to a modular station body receptacle of the base platform. In other embodiments, a modular docking deployment system similar to rebalancing system 990, implemented as a monolithic transportable container including micro-mobility fleet vehicles and/or empty docking stations with associated modular station bodies, may be transported (e.g., by a delivery truck accepting instructions from management system 240) to such deployment location and/or in accord with other deployment strategies determined in block 1102 and/or deployed, as described herein. In further embodiments, available modular station bodies may be secured to empty base platforms within such monolithic transportable container. Upon completion of a deployment, a modular docking deployment system may transmit a completion status to management system 240.

Embodiments of the present disclosure can thus provide relatively low cost, reliable, and robust methodology for the management, service, and safe operation of fleet vehicles provided for rental, reservation, and/or hire by a transportation services provider employing a dynamic transportation matching system to link fleet vehicles to requestors/riders of micro-mobility fleet vehicles, as described herein.

Where applicable, various embodiments provided by the present disclosure can be implemented using hardware, software, or combinations of hardware and software. Also, where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. A modular micro-mobility fleet vehicle docking system comprising:
   a base platform comprising a modular station body receptacle disposed on a top surface of the base platform; and
   a modular station body comprising:
      a vehicle retention system configured to secure a micro-mobility fleet vehicle to the modular station body; and
      a base platform interface disposed at a bottom surface of the modular station body and configured to be physically secured to the base platform by the modular station body receptacle;
   wherein the modular station body receptacle or the base platform interface has a pogo pin connector configured with an integrated interface to releasably lock the modular station body to the base platform and transmit power from the base platform to the modular station body.

2. The modular micro-mobility fleet vehicle docking system of claim 1, wherein the pogo pin connector is further configured to release the modular station body from the base platform, and wherein the base platform comprises:
   a sub-stabilization layer disposed adjoining a bottom surface of the base platform and configured to prevent damage to the base platform by physical impact and/or moisture ingress beneath the base platform; and one or more platform interlock features disposed along at least a portion of a perimeter of the base platform, wherein the one or more platform interlock features are configured to provide a predefined relative position and/or orientation of the base platform relative to an adjoining base platform.

3. The modular micro-mobility fleet vehicle docking system of claim 1, wherein the modular station body comprises:
a presentation interface disposed at a top surface of the modular station body and configured to physically support and/or provide electrical power to a station feature coupled to or within the presentation interface.

4. The modular micro-mobility fleet vehicle docking system of claim 3, wherein the station feature comprises:
one or more of a bench feature, a garden feature, a programmable light element, an informational display, a dot matrix display, a solar cell array, programmable signage, a community post board, a shade support pillar, and/or an additional presentation interface to provide a serial or stacked presentation interface arrangement.

5. The modular micro-mobility fleet vehicle docking system of claim 1, wherein:
the modular station body is implemented as a cylindrical pedestal docking station; and
the vehicle retention system is implemented as an enclosed wheel slot through the modular station body and comprises an internal mechanical clamp or collet configured to secure a front wheel of the micro-mobility fleet vehicle to the modular station body and/or provide charging power to the micro-mobility fleet vehicle.

6. The modular micro-mobility fleet vehicle docking system of claim 1, wherein:
the modular station body is implemented as a cylindrical pedestal docking station; and
the vehicle retention system is implemented as a locking cable receptacle in the modular station body and comprises an internal locking mechanism configured to secure a pin attached to a free end of a locking cable for the micro-mobility fleet vehicle and/or provide charging power to the micro-mobility fleet vehicle.

7. The modular micro-mobility fleet vehicle docking system of claim 1, wherein:
the modular station body is implemented as a cylindrical pedestal docking station; and
the vehicle retention system is implemented as a retractable locking cable and a locking pogo connector assembly configured to be secured to a locking orifice of the micro-mobility fleet vehicle and/or provide charging power to the micro-mobility fleet vehicle.

8. The modular micro-mobility fleet vehicle docking system of claim 1, wherein:
the modular station body is implemented as a stadium pedestal docking station; and
the vehicle retention system is implemented as a partial wheel recess extending partially through a long axis of the modular station body and comprises a mechanical clamp or collet configured to secure a front wheel of the micro-mobility fleet vehicle to the modular station body and/or provide charging power to the micro-mobility fleet vehicle.

9. The modular micro-mobility fleet vehicle docking system of claim 1, wherein:
the modular station body is implemented as a loop docking station; and
the vehicle retention system is implemented as an enclosed wheel slot through the modular station body and comprises a mechanical clamp or collet configured to secure a front wheel of the micro-mobility fleet vehicle to the modular station body and/or provide charging power to the micro-mobility fleet vehicle.

10. The modular micro-mobility fleet vehicle docking system of claim 1, wherein:
the modular station body is implemented as a roughly cuboid docking station comprising a symmetrical or asymmetrical shape with respect to an orientation of the vehicle retention system; and
the vehicle retention system is implemented as a partial wheel recess extending partially through the modular station body and comprises a mechanical clamp or collet configured to secure a front wheel of the micro-mobility fleet vehicle to the modular station body and/or provide charging power to the micro-mobility fleet vehicle.

11. A demark station comprising the modular micro-mobility fleet vehicle docking system of claim 1, wherein the base platform comprises a first base platform, the demark station further comprising:
at least one kiosk station coupled to a second base platform of the demark station, wherein the at least one kiosk station is implemented as a repair station, a food dispensary station, and/or an information station;
a support pillar coupled to a third base platform of the demark station; and
a shade structure coupled to and supported by the support pillar.

12. A rebalancing system comprising the modular micro-mobility fleet vehicle docking system of claim 1, wherein the base platform comprises a first base platform and the modular station body comprises a first modular station body, the rebalancing system further comprising:
a second base platform coupled to a second modular station body comprising a plurality of vehicle retention systems configured to form a linear array of docked micro-mobility fleet vehicles; and
at least one micro-mobility fleet vehicle docked to the second modular station body via a corresponding at least one of the vehicle retention systems.

13. The modular micro-mobility fleet vehicle docking system of claim 1, wherein the pogo pin connector is integrated with the base platform interface of the modular station body and is configured to be engaged releasably with the modular station body receptacle of the base platform.

14. The modular micro-mobility fleet vehicle docking system of claim 1, wherein the pogo pin connector comprises a cylindrical locking extension.

15. The modular micro-mobility fleet vehicle docking system of claim 1, wherein the pogo pin connector is configured to be controlled by a mechanical or electromechanical locking mechanism, and wherein the mechanical or electromechanical locking mechanism is configured to be controlled via a fleet servicer interface.

* * * * *